Jan. 5, 1960 D. J. MUNROE 2,920,148
RECORDER-REPRODUCER APPARATUS
Filed Aug. 10, 1956 8 Sheets-Sheet 1

Inventor
David J. Munroe
by Macon, Kolehmainen, Rathburn and Wyss
Attorneys.

Jan. 5, 1960   D. J. MUNROE   2,920,148
RECORDER-REPRODUCER APPARATUS
Filed Aug. 10, 1956   8 Sheets-Sheet 2

Inventor
David J. Munroe
by Mason, Kolehmainen,
Rathburn and Wyss.
Attorneys

Inventor
David J. Munroe
by Mason, Kolehmainen,
Rathburn and Wyss.
Attorneys.

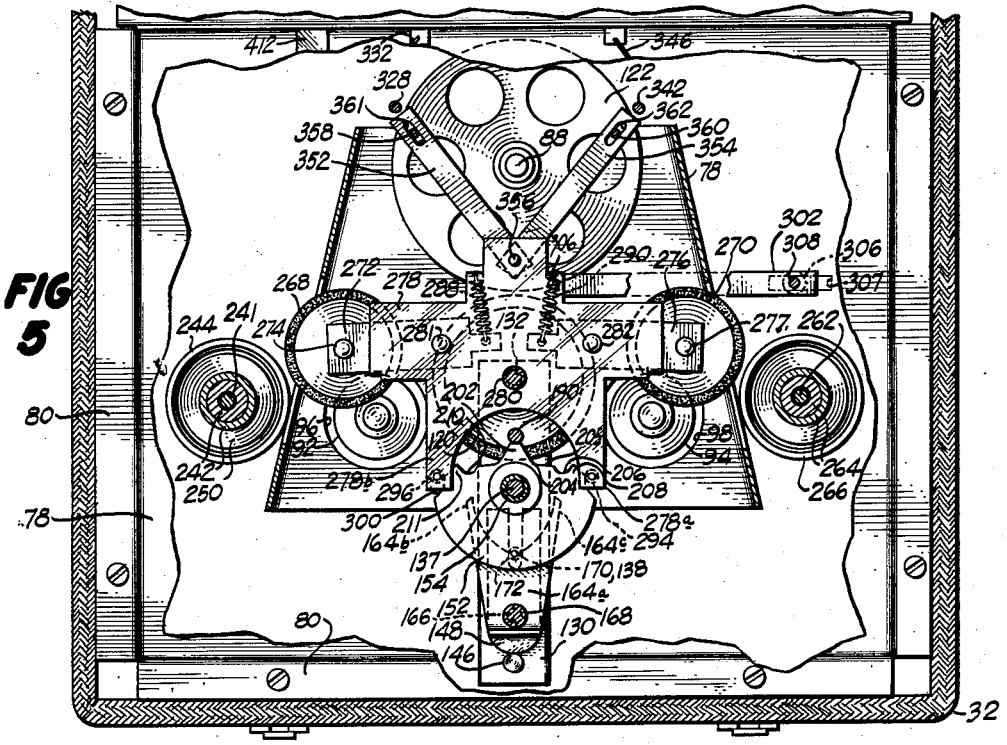
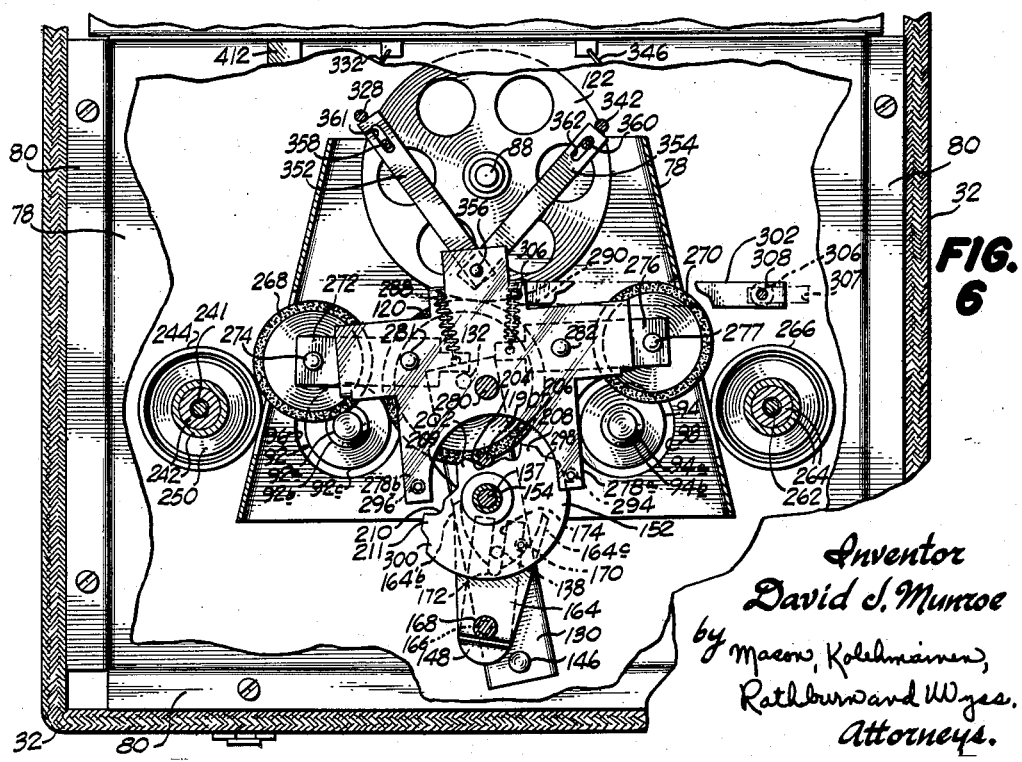

Jan. 5, 1960 D. J. MUNROE 2,920,148
RECORDER-REPRODUCER APPARATUS
Filed Aug. 10, 1956 8 Sheets-Sheet 5

Inventor
David J. Munroe
by
Mason, Kolehmainen,
Rathburn and Wyss.
Attorneys.

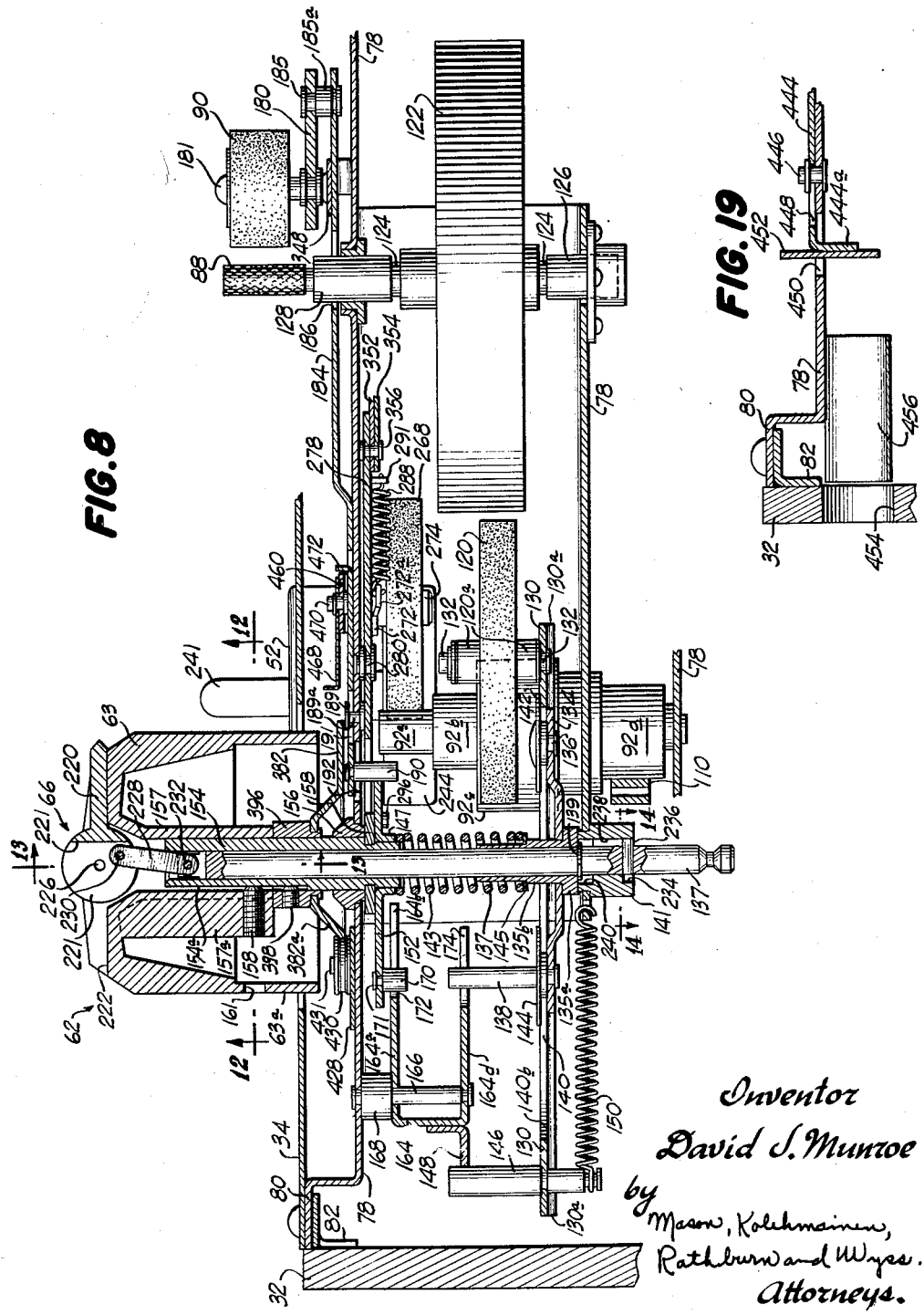

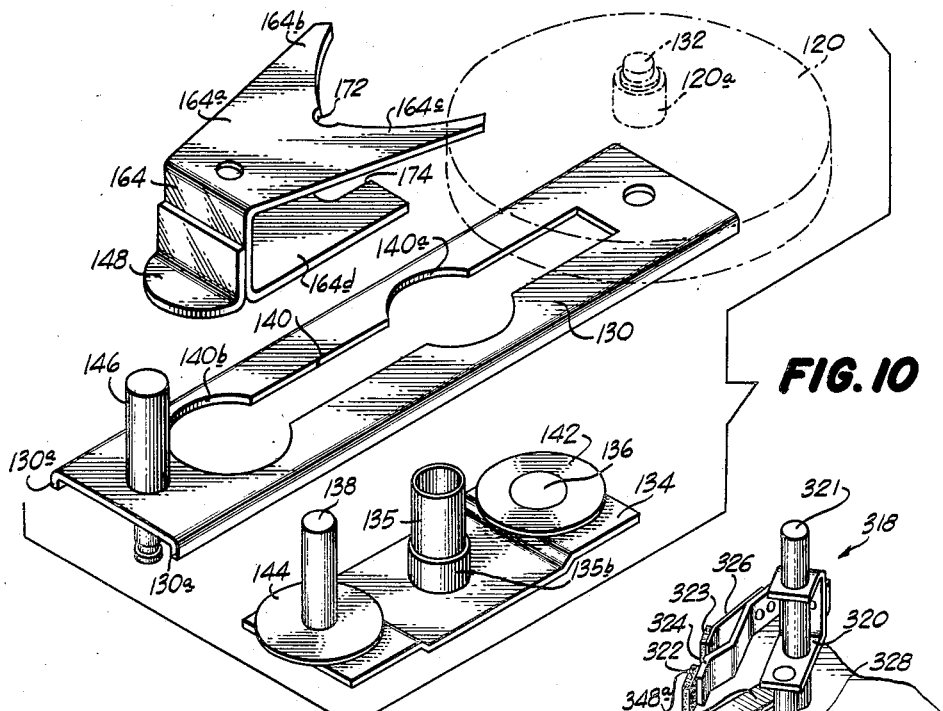

Jan. 5, 1960          D. J. MUNROE          2,920,148
RECORDER-REPRODUCER APPARATUS

Filed Aug. 10, 1956          8 Sheets-Sheet 8

Inventor
David J. Munroe
by
Mason, Kolehmainen, Rathburn and Wyss.
Attorneys.

United States Patent Office 2,920,148
Patented Jan. 5, 1960

2,920,148

RECORDER-REPRODUCER APPARATUS

David J. Munroe, Racine, Wis., assignor to Webster Electric Company, Racine, Wis., a corporation of Delaware Application August 10, 1956, Serial No. 603,414

24 Claims. (Cl. 179—100.2)

This invention relates to a recorder-reproducer apparatus utilizing an elongated record medium and, more particularly, to a plural speed bidirectional multichannel tape recorder-reproducer apparatus having new and improved means for moving and controlling the movement of an elongated medium such as magnetic tape or wire.

The desirability of providing a tape recorder having as large a capacity for storing information as possible is well known. In some instances, the tape reels or wire spools are physically enlarged to increase the amount of storage medium that is available for use without requiring a replacement of the record medium source. However, increasing the size of tape reels often presents a problem of storing the reels and an attendant inconvenience in handling and manipulating these oversized reels. Another attempt to obviate this problem involves the division of a length of magnetic tape into two effective storage channels by the use of transducers disposed adjacent transversely spaced portions of the medium and the provision of means for moving the record medium or tape in two different directions during which the data is stored on the two separate channels. The data handling capacity of a magnetic recorder can be further increased by reducing the recording and reproducing speed for material or data which does not require high fidelity reproduction, a higher recording and reproducing speed also being provided for high fidelity recordings.

Accordingly, one object of the present invention is to provide a plural speed bidirectional multichannel recorder-reproducer apparatus using an elongated record medium.

Another object is to provide new and improved means for moving an elongated record medium between spaced reels in a recorder-reproducer apparatus.

Another object is to provide a magnetic tape recorder-reproducer including improved control means which are interlocked with transducer head control means and record-listen control means.

A still further object is to provide new and improved speed control means in an apparatus utilizing an elongated record medium in which interlock means are provided therefor.

In accordance with these and many other objects, an embodiment of the present invention comprises a recorder-reproducer apparatus including a pair of transducing means disposed adjacent transversely spaced channels on a length of magnetic tape which is moved between a pair of spaced reels rotatably mounted on the frame of the apparatus. To provide a means for driving the magnetic tape in opposite directions during which different ones of the transducing means are rendered effective, a pair of oppositely rotating driving members or elements are provided. A control member pivotally mounted on the frame of the reproducer is shifted in a first direction to place one of a pair of idlers rotatably mounted thereon in driving engagement with one of the driving members and with means for rotating one of the tape reels. If the plate is shifted to a second position, a second one of the idlers is placed in driving engagement with the other one of the driving members to rotate a reel driving means for the other of the two reels. To drive the tape between the two reels, a capstan and pinch roller drive assembly is provided in which a driven element secured to the capstan is placed in driving engagement with a selected one of the two driving members through a shiftable idler controlled by the main control means. In order to selectively render one of a pair of pressure pad assemblies associated with the pair of transducing means effective in accordance with the channel on which a transducing operation is to be performed, the main control means includes means controlled by the shiftable plate for moving only one of the pressure pad assemblies into engagement with the magnetic tape in accordance with the direction of movement of the tape. In a similar manner, switching means interconnecting the transducing means with conventional amplifier and oscillator components are operated under the control of the shiftable plate to insure that only a single one of the two transducing means is electrically conditioned for operation during any selected direction of movement of the magnetic tape.

Speed change means are included in the recorder-reproducer in the form of control means for shifting the position of the capstan driving idler in a direction parallel to the axis of rotation of the two driving members so that this idler is adapted to engage driving portions of different diameters on the oppositely rotating driving members. In this manner, means are provided for selectively controlling the speed at which the capstan drive advances the magnetic tape, the reel driving means being rotated at a fixed speed under the control of the pair of idlers supported on the shiftable plate in the main control means. The speed change means are further interlocked with the main control means so that the position of the idler and, accordingly, the speed at which the magnetic tape is advanced can be shifted only when the main control is in a stop or inoperative position.

Other objects and advantages of the present invention will become apparent from the following description of an illustrative embodiment thereof in the course of which reference is made to the accompanying drawings in which:

Fig. 5 is a top plan view of the apparatus in the inoperative setting shown in Fig. 2 with the frame broken away to illustrate the details of the tape driving mechanism;

Fig. 6 is a fragmentary top plan view similar to Fig. 5 illustrating the driving mechanisms of the recorder-reproducer apparatus when the magnetic tape is driven in a first forward direction, as illustrated in Fig. 3;

Fig. 8 is an enlarged fragmentary cross sectional view taken along line 8—8 in Fig. 1;

Fig. 8 is an enlarged fragmentary cross sectional view taken along line 9—9 in Fig. 2 illustrating a reel supporting and driving means;

Fig. 10 is an exploded perspective view of means for movably supporting a speed change idler pulley which is shown in dot and dash outline;

Fig. 11 is an enlarged fragmentary perspective view illustrating a pressure pad assembly and control means therefor;

Fig. 12 is an enlarged cross sectional view of a knob and related portions of a main control unit and the speed control means taken along line 12—12 in Fig. 8, assuming the knob to be completely shown therein;

Fig. 13 is an enlarged cross sectional view of the knob and related control mechanism taken along line 13—13 in Fig. 8, again assuming that these elements are fully shown in Fig. 8;

Fig. 14 is an enlarged cross sectional view taken along line 14—14 in Fig. 8 illustrating another portion of the speed control means;

Fig. 19 is an enlarged cross sectional view taken along line 19—19 in Fig. 2 illustrating means for operating an auxiliary braking control;

Figures 7, 20, 21, 22:
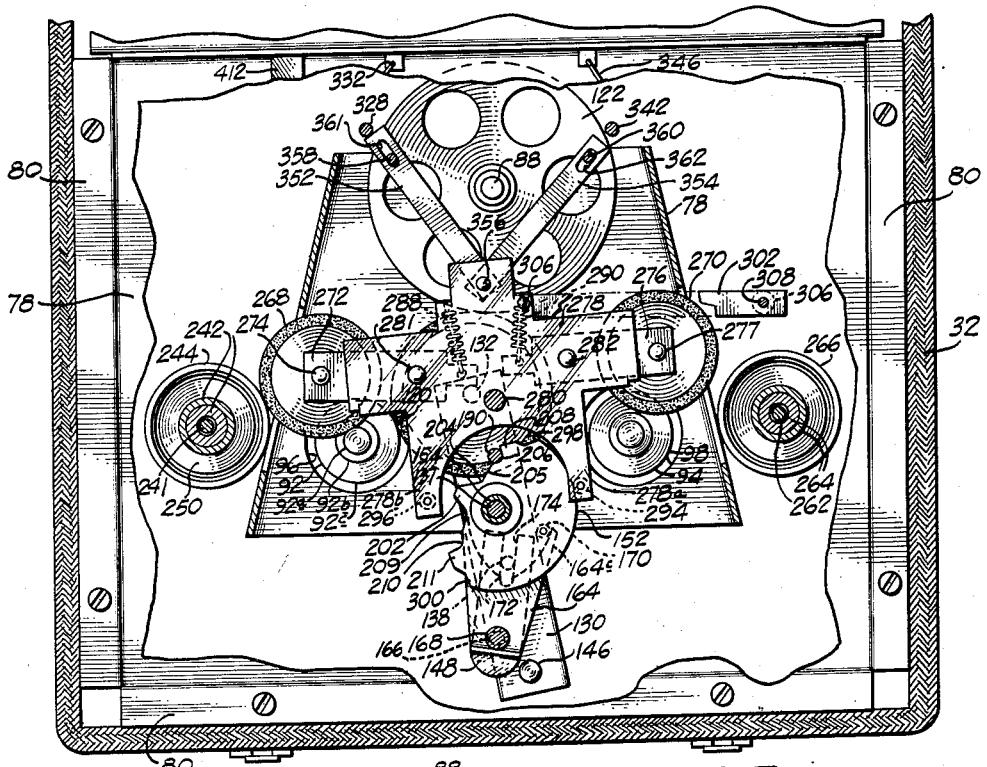
Fig. 7 is a top plan view with the frame broken away in the manner of Figs. 5 and 6 to illustrate the details of the driving mechanism when the magnetic tape is being advanced in a fast forward speed in a first direction, as also illustrated in Fig. 4.
Fig. 20 is a schematic view indicating the relative positions of the driving components of the apparatus in a stop position.

Fig. 21 is a schematic view illustrating the relative positions of the driving components when the magnetic tape is being driven in a first direction in a forward setting of the apparatus; and Fig. 22 is a schematic view illustrating the relative positions of the driving components of the apparatus when the apparatus is adjusted for forward movement of the magnetic tape in a second direction opposite to that illustrated in Fig. 21 of the drawings.

Figure 1:
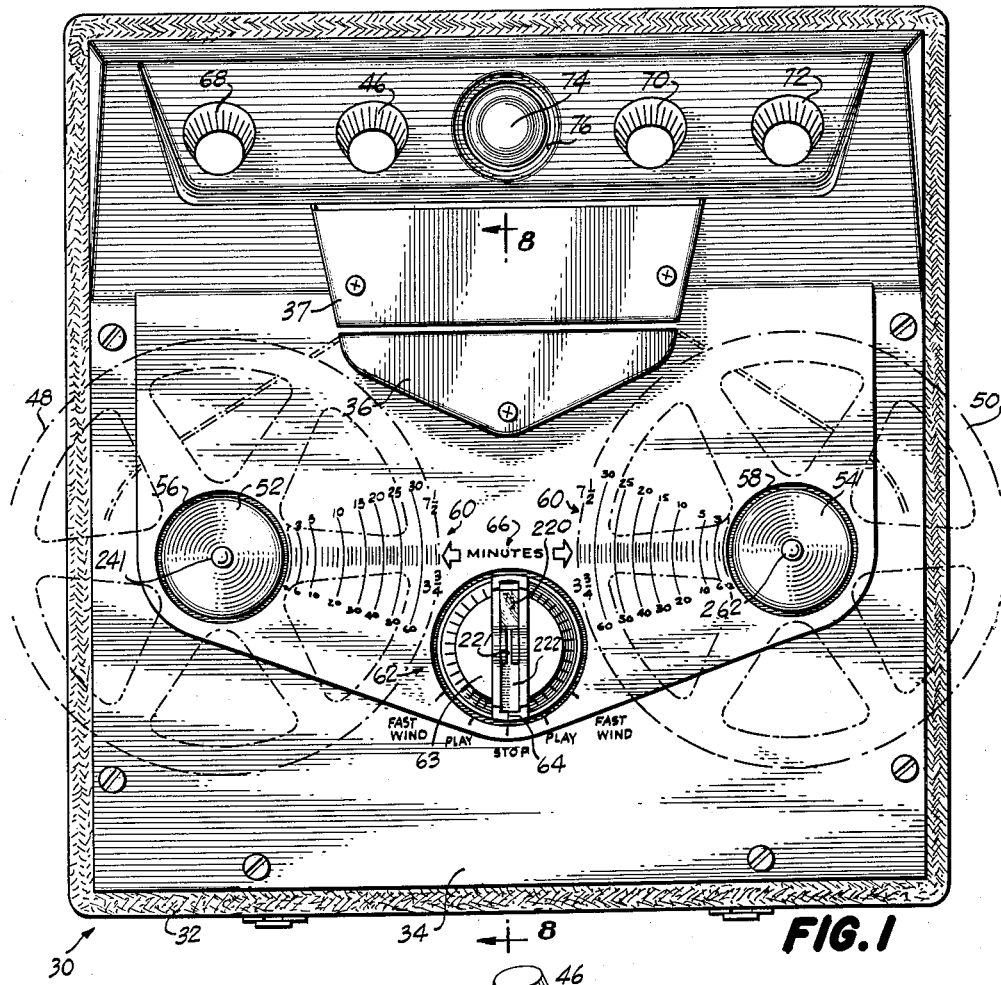
Fig. 1 is a top plan view of a recorder-reproducer apparatus embodying the present invention with the cover removed and showing a pair of tape reels in dot and dash outline.
Figure 2:
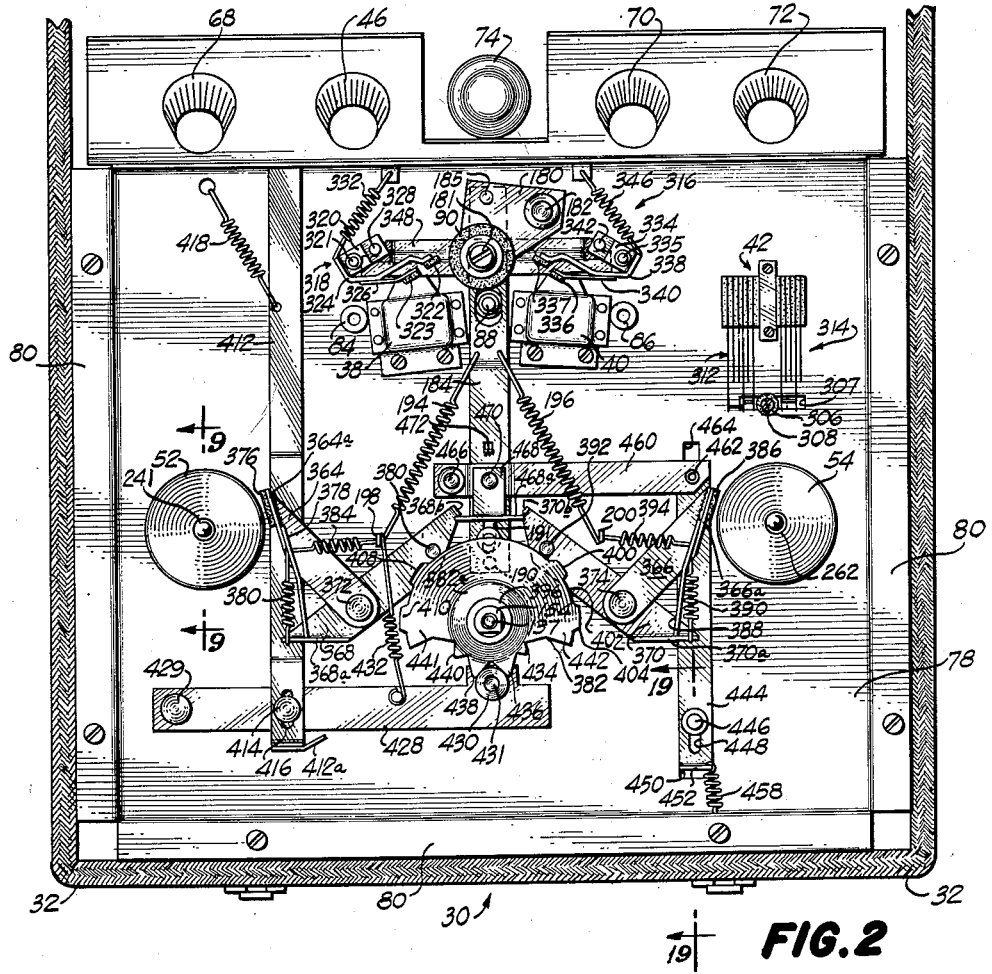
Fig. 2 is a top plan view of the apparatus in a stop position with a faceplate removed to illustrate the details of means for controlling the pressure pad assemblies, a capstan and pinch roller drive means, and brake means for the tape reels.

Referring now to Figs. 1 and 2 of the drawings, a recorder-reproducer apparatus embodying the present invention is indicated generally as 30 and includes a cabinet 32 provided with a cover (not shown) which is pivotally and detachably mounted thereon. The cabinet 32 includes a supporting frame or base on which is mounted a faceplate 34, a transducer head cover plate 36 partially enclosing a pair of spaced transducing heads 38 and 40 (Fig. 2), and a cover 37 enclosing components associated with the heads. The transducing heads 38 and 40 are electrically connected to conventional amplifier and oscillator circuits mounted within the cabinet 32 under the control of a switch assembly 42 (Fig. 2) which is automatically operated in accordance with the direction of movement of the magnetic tape so that only a selected one of the transducing heads 38 or 40 is conditioned for operation and for further control by a record-listen control assembly 44 adapted to be manually actuated by a knob 46.

A pair of tape supplying reels 48 and 50 (Fig. 1) are mounted on a pair of movably mounted rotatable cup-shaped supporting members 52 and 54, respectively, which are positioned within openings 56 and 58 formed in the faceplate 34. The faceplate 34 is provided with parallel columns of indicia 60 adjacent each of the reels 48 and 50 to permit the number of minutes of playing or recording time remaining on the reels 48 and 50 to be determined by visually comparing the amount of tape remaining on the supply reel with the indicia, the indicia providing an indication of time for tape movement at either a high speed of seven and one-half inches per second or a low speed of three and three-fourths inches per second.

The speed and direction of movement of the magnetic tape between the reels 48 and 50 is controlled by a main control assembly indicated generally as 62 (Figs. 1 and 8) which is actuated by a knob 63 having an index mark 64 which cooperates with indicia imprinted on the faceplate 34. As indicated by indicia, the main control assembly 62 has the five following positions: a stop position in which the tape driving components are inoperative and the transducing heads 38 and 40 are rendered ineffective; a first play position in which the magnetic tape is driven from the reel 50 to the reel 48 at a transducing speed and in which the switch means 42 conditions the transducing head 40 for operation; a second play position in which the magnetic tape is advanced at a transducing speed from the reel 48 to the reel 50 and in which the switching means 42 renders the transducing head 38 effective to perform transducing operations on the tape; a first fast wind position in which the magnetic tape is quickly advanced from the reel 50 to the reel 48, both of the transducing heads 38 and 40 being rendered ineffective; and a second fast forward position in which the magnetic tape is advanced from the reel 48 to the reel 50 at high speeds, the transducing heads 38 and 40 again being rendered ineffective. To accomplish all of these functions, the main control assembly 62 controls the braking of the supporting means 52 and 54, controls the effectiveness and direction of drive of a capstan and pinch roller type of tape drive mechanism, controls the operation of the switching means 42 whereby connections to the transducers 38 and 40 are established, controls the effectiveness of an interlock controlling the record-listen control assembly 44, renders one of a pair of pressure pad assemblies effective to urge the magnetic tape against a selected one of the transducing heads 38 and 40 in accordance wtih the direction of movement of the magnetic tape, and establishes driving connections to one of the supporting means 52 or 54 to permit one of the reels 48 and 50 to act as a driven takeup reel in accordance with the direction of tape movement.

A speed control means 66 is provided for driving the capstan at either the three and three-fourths inches per second or the seven and one-half inches per second tape driving speed, and the control means 66 (Fig. 8) is interlocked with the main control assembly 62 so that the effective driving speed of the recorder-reproducer apparatus 30 can only be varied in the stop position of the main control assembly 62, thereby preventing any change in the speed of operation thereof during movement of the magnetic tape between the spaced reels 48 and 50. The amplifying components (not shown) in the recorder-reproducer apparatus 30 include means for automatically and electrically compensating these circuits for varying tape speeds, the compensation circuits being any of the types well known in the art.

A plurality of knobs 68, 70, and 72 control the effectiveness of a loud speaker associated with the amplifying means (not shown), provide off-on and adjustable tone control, and manually adjustable volume control, respectively. A glow lamp 74 which is visible through an opening 76 in the faceplate 34 is provided to indicate the level of the amplifier output, thereby providing a visible indication over the recording level of the apparatus 30. The apparatus 30 further includes a plurality of plug jacks (not shown) and receptacles (not shown) for interconnecting the unit 30 with either a microphone or a phonograph-radio input, for providing interconnections of the unit 30 with an external loud speaker, or for interconnecting the unit 30 with a source of power by means of a detachable line cord.

The electrical components and the driving and driving control mechanisms of the recorder-reproducer apparatus 30 are generally supported from a frame 78 having integrally formed and peripherally extending offset flange portions 80 which rest on angle brackets 82 (Fig. 8) secured to the walls of the cabinet 32, thereby detachably supporting the operating components of the recorder-reproducer apparatus 30 within the cabinet 32 to permit their removal.

Each of the transducing heads 38 and 40 includes both a record-reproduce head and an erase head which are selectively energized and conditioned for operation under the control of the switch means 42 and the record-listen control assembly 44. The gaps of the magnetic heads forming the unit 38 are so located relative to the supporting structure for the head 38 that, when magnetic tape is moved relative thereto, the items of information are recorded in a channel transversely disposed adjacent one edge of the tape. On the other hand, the record-reproduce head and the erase head provided in the transducer head assembly 40 includes gaps which are displaced relative to those in the assembly 38 so that the items of information supplied to the assembly 40 are recorded on a channel adjacent one edge of the magnetic tape which is transversely displaced from the items of information recorded under the control of the transducer head 38. A pair of tape guiding means 84 and 86 disposed adjacent the transducing head assemblies 38 and 40 aid in guiding the magnetic tape supplied by the reels 48 and 50 so that the tape passes over the gaps in the transducing heads in proper alignment therewith.

As indicated above, the main control means 62 controls movement of the tape between the reels 48 and 50 in accordance with the selective settings thereof. When the main control 62 is adjusted to a play position, the magnetic tape is moved at a proper speed for transducing operations by a pinch roller and capstan type of drive including a capstan 88 which is rotatable about a fixed axis and a movably mounted pinch roller 90. The capstan 88 is rotated in a selected one of two directions in accordance with the selected direction of tape movement between the reels 48 and 50. In the fast wind setting of the main control means 62, the capstan and pinch roller drive is rendered ineffective, and the magnetic tape is advanced by directly driving a selected one of the reel supporting means 52 or 54 in accordance with the direction in which the magnetic tape is to be advanced.

Figure 16:
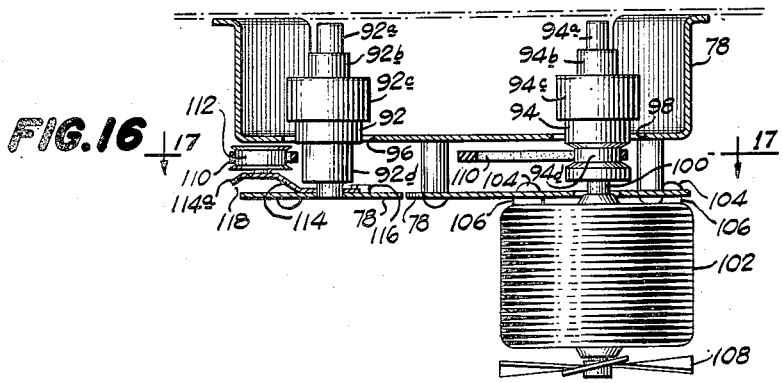
Fig. 16 is a cross sectional view illustrating means for rotating a pair of driving members in opposite directions.
Figure 17:
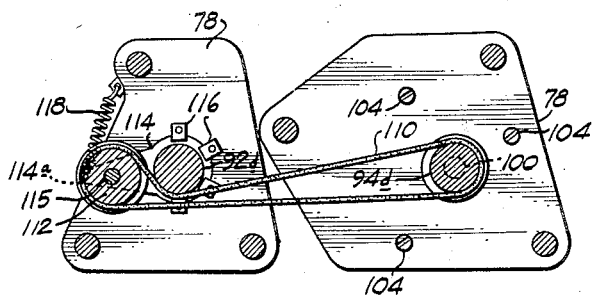
Fig. 17 is a cross sectional view taken along line 17—17 in Fig. 16, assuming that the complete structure is disclosed therein.

To provide two separate and oppositely rotating driving elements or members for actuating the apparatus 30, a pair of plural diameter driving members 92 and 94 (Figs. 8, 16, and 17) are provided. The members 92 and 94 include reduced diameter portions 92a and 94a for driving the reel supporting means 52 and 54 at a constant speed, a plurality of driving portions 92b and 94b for driving the capstan 88 at a low speed of three and three-fourths inches per second, and enlarged diameter driving portions 92c and 94c for driving the capstan at the fast speed of seven and one-half inches per second. The driving member 92, which extends through an opening 96 in one portion of the supporting frame 78, is rotatably mounted on another portion of the frame 78 at one end thereof, while the driving member 94 includes an intermediate portion extending through an opening 98 in one portion of the frame 78 and is directly secured at its lower end to a shaft 100 of a drive motor 102 forming the prime mover of the recorder-reproducer apparatus 30. The motor 102 is resiliently mounted on a lower portion of the frame 78 by a plurality of fasteners 104 with resilient cushioning means 106 interposed between the frame 78 and the housing of the motor 102. An impeller blade 108 is secured to the other end of the motor shaft 100 to provide currents of air for cooling the motor and the electronic components of the apparatus 30. The motor 102 is energized by operation of the on-off control actuated by the knob 70 so that the motor 102 remains in continuous rotation during energization of the apparatus 30, thereby maintaining the driving member 94 in continuous rotation.

In order to provide means for driving the member 92 at the same speed as the member 94 and in an opposite direction, a driving means is provided including a flexible belt 110 which is looped around a reduced diameter drive pulley portion 94d of the drive member 94 and an idler pulley 112 with an intermediate bight portion of the belt 110 bearing against a reduced diameter portion 92d of the driving member 92. The idler pulley 112 is rotatably mounted on a supporting bracket 114 by a pin 115, and the bracket 114 is mounted on the frame 78 for rotation about an axis substantially coinciding with the axis of rotation of the driving member 92 by a structure comprising a plurality of peripherally spaced retaining clips 116. An end portion 114a of the bracket 114 is secured to a tension spring 118, the other end of which is secured to the frame 78 so as to bias the bracket 114 to pivot in a clockwise direction relative to the axis of rotation of the driving member 92. This resilient urging of the bracket 114 in a clockwise direction displaces the idler pulley 112 so that tension is applied to the flexible belt 110 to maintain it in driving engagement with the driving member 94 and to also maintain the belt 110 in a driving engagement with the portion 92d of the driving member 92. The provision of this type of driving arrangement for the driving member 92 insures that it will be rotated in a direction opposite to the direction of rotation of the member 94 irrespective of the direction of rotation for which the motor 102 is designed.

To provide a means for utilizing the driving members 92 and 94 for rotating the capstan 88 in different directions and at different speeds, a movably mounted rubber tired idler roller 120 (Fig. 8) is provided which selectively provides driving engagement between the driving members 92 and 94 and a flywheel 122 under the control of the main control means 62. The flywheel 122 is rotatably mounted on the frame 78 by means of a shaft 124 which is secured thereto and which is rotatably received at its lower end in a bearing 126 carried by the frame 78. The upper end of the shaft 124 extends upwardly through a bearing 128, also carried by the supporting frame 78, to terminate in a knurled upper portion comprising the capstan 88.

To provide means for supporting the idler 120 for both rotary and shifting movement relative to the driving members 92 and 94 and the flywheel 122, the idler 120 is rotatably mounted on an arm 130 (Figs. 8 and 10) by a pin 132 which is rotatably journaled within an opening formed in bossed portions 120a of the idler 120. The arm 130 is slideably mounted on a plate 134 by a plurality of pins 136 and 138 which are secured at their lower end to the plate 134 and which cooperate with a slot 140 formed in the center of the arm 130. A pair of washers 142 and 144 cooperate with the pins 136 and 138 to maintain the arm 130 in longitudinal alignment with the plate 134 while permitting rectilinear movement of the arm 130 relative to the plate 134. The arm 130 is provided with flanged edges 130a which cooperate with the edge surfaces of the plate 134 to further guide the arm 130 for rectilinear movement relative to the plate 134. The slot 140 is formed with enlarged portions 140a and 140b of such diameters as to receive the washers 142 and 144, respectively, thereby to permit the arm 130 to be removed from its assembled relationship with the plate 134.

The plate 134 is rigidly secured to a sleeve 135 which is rotatably mounted on a shaft 137 forming a portion of the speed control unit 66. A lower enlarged portion 135a (Fig. 8) of the sleeve 135 supports the lower surface of the plate 134 at one side and on the other side slideably engages both the upper edge of a lock washer 139 carried by the shaft 137 and the upper edge of a bushing 141 secured to the frame 78. The sleeve 135 and, accordingly, the plate 134 and the arm 130 are maintained in the vertical position illustrated in Fig. 8 by a compression spring 143 which is interposed between a washer 145 carried on a shouldered portion 135b of the sleeve 135 and the end of a boss 147 formed on a cam 152 comprising a portion of the main control means 62.

In order to prevent the production of flats on the rubber tired idler 120 and, accordingly, to prevent the production of "wow" during transducing operations, means are provided for normally maintaining the idler 120 out of engagement with both the flywheel 122 and both of the driving members 92 and 94 when the main control means 62 is in a stop position. More specifically, when the main control 62 is in a stop position, a pin 146 (Figs. 8 and 10) carried on the arm 130 engages a rearwardly extending and rounded cam member 148 so that the arm 130 and, accordingly, the rubber tired idler 120 is maintained in the position illustrated in Fig. 5 in which the idler 120 does not engage either of the driving members 92 or 94 or the flywheel 122, the arm 130 normally being urged toward engagement with the flywheel 122 and the driving members 92 and 94 by a tension spring 150 which is secured at one end to the frame 78 and at its other end to a lower portion of the pin 146.

To provide a control over shifting movement of the capstan driving idler 120, the main control means 62 includes the cam 152 which is rigidly secured to the lower end of a main control shaft 154 by the boss 147. The main control shaft 154 is rotatably mounted on the main frame 78 by a bushing 156 which is maintained in a spaced relationship with the upper surface of the main control cam 152 by a spacing washer 158 secured to the shaft 154 intermediate the control cam 152 and the bushing 156. To provide a means for actuating the main control assembly 62 including the cam 152 to the various spaced positions designated by the indicia on the faceplate 34, the knob 63 is provided which is rigidly secured to the control shaft 154 by a pair of mutually perpendicular set screws 158 and 160 (Figs. 8, 12, and 13) which extend through a boss 157 formed integral with the knob 63 to engage flats 154a and 154b formed on the shaft 154. The set screws 158 and 160 are threadedly received within mutually perpendicular enlarged portions 157a and 157b which project radially outward from the periphery of the boss 157. A skirt portion 63a of the knob 63 is provided with a pair of spaced apertures 161 and 162 to permit the insertion of a tool into the area enclosed by the skirt 63a for adjusting the set screws 158 and 160. Accordingly, since both the knob 63 and the control cam 152 are rigidly secured to the main control shaft 154, rotation of the knob 63 produces a like rotation of the control cam 152.

Rotary movement of the control cam 152 is converted into shifting movement of the supporting means for the capstan driving idler 120 by the use of an intermediate U-shaped control member 164 (Figs. 8 and 10), the bight portion of which is rotatably supported on the main frame 78 by a pivot pin 166 having an enlarged portion 168 interposed between the supporting frame 78 and an upper arm 164a of the control member 164 to space these members. In order to control movement of the pivotally mounted control link or member 164, the control cam 152 includes a cam follower roller 170 which is rotatably mounted on a rear portion of the cam 152 by a headed pin 171, the follower 170 normally being received within a half round depression 172 midway between two spaced arms 164b and 164c formed integral with the top wall or arm 164a of the control member 164. To provide a means for coupling movement of the control member 164 to the supporting means for the idler 120, the upper end of the pin 138 is received within a slot 174 formed in a lower leg 164d of the control member 164, the rounded cam member 148 which engages the pin 146 being secured to the bight portion of the control link 164.

In the normal stop position of the apparatus 30, the main control 62 is in the position illustrated in Figs. 1 and 5 of the drawings in which the cam follower 170 is received within the recess 172 formed in the upper arm 164a of the control link 164. In this position, the cam member 148 carried by the control link 164 engages the pin 146 carried by the arm 130 to overcome the resilient forces of the tension spring 150, thereby to hold the rubber tired idler 120 out of engagement with both the flywheel 122 and either of the driving members 92 or 94. When the magnetic tape is to be driven by the capstan 88 from the reel 50 to the reel 48 at the high speed of seven and one-half inches per second, the main control knob 63 is rotated in a counterclockwise direction, as shown in Fig. 1, so that the index mark 64 is aligned with the indicia indicating one of the play positions of the apparatus 30. In moving to this position, which is illustrated in Fig. 6 of the drawings, the cam 152 is rotated in a counterclockwise direction so that the cam follower 170 moves out of the depression 172 to engage the curved inner edge of the arm 164c. Engagement of the follower 170 with the arm 164c deflects the control link 164 in a clockwise direction around the pivot point defined by the pin 166 so that the pin 138 received within the slot 174 is displaced to the right, as illustrated in Fig. 6. This displacement of the pin 138, which is secured to the plate 134, rotates the plate 134 and the arm 130 in a counterclockwise direction around the axis provided by the shaft 137, the enlarged portion 135a of the sleeve 135 being in sliding engagement with the washer 139 and the upper extremity of the bushing 141.

Counterclockwise rotation or deflection of the arm 130 to the general position shown in Fig. 6 permits the idler 120 to be moved into engagement with the driving member 92 and the flywheel 22 since, in moving to the position shown in Fig. 6, the pin 146 is moved out of engagement with the detent cam 148 so that the tension spring 150 slides the arm 130 relative to the supporting plate 134 to resiliently bias the rubber tired idler 120 into driving engagement with the periphery of the flywheel 122 and the enlarged portion 92c of the driving member 92. The idler 120 transmits the counterclockwise rotation of the driving member 92 (Figs. 6 and 21) to the flywheel 122 so that the capstan 88 is rotated in a counterclockwise direction to advance the magnetic tape from the reel 50 to the reel 48 under the control of the capstan 88 and the pinch roller 90.

In order to restore the driving means for the capstan 88 to a normal position from the position shown in Fig. 6, the control knob 63 is rotated in a clockwise direction to the position illustrated in Figs. 1 and 5. During this movement, the cam means 148 engages the pin 146 to slide the arm 130 outwardly away from the driving member 92 and the flywheel 122, thereby to move the idler 120 out of driving engagement therewith. Concurrently with sliding the arm 130 rearwardly, the counterclockwise rotation of the control link 164 produced by the clockwise rotation of the control cam 152 and the knob 63 rotates the arm 130 and the plate 134 in a clockwise direction around the axis provided by the shaft 137 so that the cam follower 170 is again received within the depression 172 formed in the upper arm 164a of the control link 164, the pin 138 being substantially aligned with the follower 170 in this position.

The main control means 62 is adjusted to advance magnetic tape from the reel 48 to the reel 50 at a speed of seven and one-half inches per second under the control of the capstan 88 by rotating the main control knob 63 in a clockwise direction so that the control cam 152 is rotated in a clockwise direction from the stop position shown in Fig. 5. In response to this movement of the control cam 152, the control link 164 is pivoted about the axis provided by the pin 166 in a counterclockwise direction to cause a consequent clockwise rotation of the arm 130 and the supporting plate 134. Clockwise rotation of the arm 130 moves the rubber tired idler 120 adjacent the flywheel 122 and the driving member 94 so that, when the pin 146 moves out of engagement with the cam means 148, the spring 150 slides the arm 130 relative to the supporting plate 134 to move the idler 120 into driving engagement with both the periphery of the flywheel 122 and the enlarged portion 94c of the driving member 94 which is driven in a clockwise direction by the motor 102 (Fig. 22). The clockwise rotation of the driving member 94 is transmitted through the idler 120 to rotate the flywheel 122 and the capstan 88 in a clockwise direction to advance magnetic tape from the reel 48 to the reel 50. The apparatus 30 is restored to the normal stop position illustrated in Figs. 1 and 5 by rotating the knob 63 in a counterclockwise direction so that the control link 164 is rotated in a clockwise direction and the arm 130 is rotated in a counterclockwise direction. During this counterclockwise rotation of the arm 130 and the plate 134, the cam 148 engages the pin 146 to slide the arm 130 rearwardly relative to the supporting plate 134 so as to move the idler 120 out of driving engagement with the member 94 and the periphery of the flywheel 122.

The main control means 62, in addition to placing the idler 120 in driving engagement with the flywheel 122 and a selected one of the driving members 92 and 94 in the play position of the apparatus 30, also places the idler 120 in driving engagement with the flywheel and one of the driving members 92 or 94 in the fast wind positions of the apparatus 30. However, in the fast wind positions of the apparatus 30, the magnetic tape is driven between the reels 48 and 50 at an increased rate of speed exceeding that used for transducing operations, and this high speed drive is accomplished without the use of the capstan 88 by driving the one of the reel supporting members 52 and 54. Accordingly, the main control means 62 includes means for selectively rendering the capstan 88 effective and ineffective to drive the tape during periods when the capstan 88 is rotated by moving the pinch roller 90 into engagement with the capstan 88 and the tape in the play position and by moving the pinch roller 90 out of driving engagement in the stop and fast wind settings of the apparatus 30.

To accomplish this, the pinch roller 90 is rotatably mounted on a supporting bracket 180 by a shaft 181 (Figs. 2–4 and 8), and the bracket 180 is pivotally mounted on the supporting frame 78 by a pivot pin 182. To provide means for controlling the position of the bracket 180 and, accordingly, that of the pinch roller 90 relative to the capstan 88, the bracket 180 is pivotally connected to a control arm 184 by a pivot pin 185 having an enlarged portion 185a (Fig. 8) interposed between the bracket 180 and the control arm 184. The arm 180 is slideably mounted on an upper surface of the frame 78 by an opening 186 in the arm 184 which cooperates with the bearing 128 and by a pin 189 which is slideably received within a slot 191 in the arm 184, the pin 189 having an enlarged head portion or washer 189 engaging the upper surface of the arm 184 to prevent the pin 189 from becoming displaced from the slot 191.

To selectively interconnect the pinch roller supporting means with the main control means 62, thereby to permit the control means 62 to control the effectiveness of the pinch roller and capstan type of drive by adjusting the position of the pinch roller 90, a cam follower 190 is secured to one end of the control arm 180 extending downwardly through an opening 192 (Fig. 8) in the frame 78 to be positioned adjacent the periphery of the control cam 152. The follower 190 is resiliently biased into engagement with the cam 152 by a pair of tension springs 194 and 196 which are connected at one of their ends to the arm 184 and at their other ends to a pair of lugs 198 and 200 struck out of the frame 78.

In the stop position of the apparatus 30 (Figs. 2 and 5), the pinch roller 90 is maintained out of engagement with the capstan 88 to prevent the formation of flats in the rubber tired periphery of the pinch roller, and, accordingly, the tension springs 194 and 196 bias the follower 190 into engagement with a projecting portion 202 (Fig. 5) on the periphery of the control cam 52 which retains the arm 184 and the pinch roller 90 in the position shown in Fig. 2. When the apparatus 30 is to be adjusted to a play position in which the tape drive is rendered effective, the control cam 152 is rotated in a counterclockwise direction to the position shown in Fig. 6 in which the idler 122 drives the capstan 88, as described above, and the follower 190 engages a recessed portion 204 on the periphery of the arm 152. In moving to this position under the force applied by the springs 194 and 196, the arm 184 moves downwardly, as viewed in Fig. 3, to pivot the bracket 180 in a counterclockwise direction about the pin 182 so as to resiliently bias the pinch roller 90 into driving engagement with the rotating capstan 88, thereby to advance the magnetic tape from the reel 50 to the reel 48.

Since the magnetic tape is to be moved between the reels 48 and 50 by selectively driving the reel supporting means 52 and 54 in the fast wind positions of the main control assembly 62 without the use of the capstan and pinch roller drive, and since the capstan 88 is driven in these positions by the idler 120 from either of the driving members 92 or 94, the main control means 62 includes means for moving the pinch roller 90 out of engagement with the drive capstan 88 in the fast wind positions of the apparatus 30. More specifically, when the main control knob 63 is rotated in a counterclockwise direction to the fast wind position illustrated in Figs. 4 and 7 of the drawings, the idler 120 is maintained in driving engagement with the driving member 92 and the flywheel 122, thereby to rotate the capstan 88. In moving to this position, the control cam 152 is rotated in a counterclockwise direction so that the control arm 184 is moved upwardly by sliding engagement of the follower 190 with an inclined portion 205 of the cam 152, the follower 190 being seated in a recess 206 on the cam 152 when the control assembly 62 is rotated fully into the fast wind position. A shoulder 208 formed on the cam 152 engages the follower 190 to limit counterclockwise rotation of the control cam 152 and, accordingly, of the remainder of the main control unit 62. The upward movement of the control arm 184, when viewed in Fig. 4, produced by this rotation of the cam 152 pivots the supporting plate or bracket 180 in a clockwise direction to lift the pinch roller 90 out of engagement with the capstan 88, thereby to permit the magnetic tape to be advanced from the reel 50 to the reel 48 solely under the control of rotation of the reel supporting member 52. When the main control assembly 62 is returned to its stop position by rotating the knob 63 in a clockwise direction, the follower 190 traverses the portions 205 and 204 to be engaged by the projecting portion 202 (Fig. 5) in the stop position. As described above, in this position, the control arm 184 is held in the position illustrated in Fig. 2 so that the pinch roller 90 is maintained out of driving engagement with the capstan 88.

In order to render the pinch roller capstan drive effective in the play position in which the magnetic tape is advanced by the capstan 88 from the reel 48 to the reel 50, the knob 63 is rotated in a clockwise direction so that the follower 190 moves into a recessed portion 209 of the cam 152, thereby to permit the control arm 184 to be moved downwardly to pivot the plate 180 about the pin 182 to place the pinch roller 90 in driving engagement with the capstan 88 and the interposed magnetic tape. Continuing rotation of the knob 63 in a clockwise direction toward the fast wind position moves the follower 190 into a recess 210 partially defined by a motion limiting and stop shoulder 211, also formed in the cam 152, so as to move the control arm 184 upwardly to pivot the pinch roller 90 out of engagement with the capstan 88 in this position. The magnetic tape is then advanced from the reel 48 to the reel 50 solely by rotation of the reel supporting member 54. As described above, when the main control assembly 62 is returned to the stop position illustrated in Fig. 5, the follower 190 traverses the cam portion 209 and is again moved into engagement with the projecting portion 202 to move the pinch roller 90 out of engagement with the drive capstan 88, thereby to render the capstan and pinch roller drive ineffective in the stop position.

The speed control means 66 permits the drive capstan 88 to be rotated at two different speeds so as to provide a selected lower tape speed of three and three-fourths inches per second or a higher tape speed of seven and one-half inches per second. However, since it is only necessary to provide selected driving speeds for moving the magnetic tape during the transducing operations in which movement of the magnetic tape is controlled solely by the capstan 88, the speed control means 66 includes means for shifting the vertical position of the flywheel driving idler 120 relative to the driving members 92 and 94 so that only the speed of rotation of the capstan 88 is varied by adjustment of the speed control means 66.

As described above, in the position illustrated in Fig. 8 of the drawings, the idler 120 is adapted to be shifted into driving engagement with the flywheel 122 and either of the large diameter driving portions 92c or 94c of the driving members 92 and 94, thereby to rotate the capstan 88 at the higher transducing speed of seven and one-half inches. In order to provide the lower three and three-fourths inches per second transducing speed, the idler 120, together with the supporting means therefor, are vertically shifted by the speed control means 66 so that the idler 120 is adapted to be shifted into driving engagement with the flywheel 122 and the smaller diameter driving portions 92b or 94b of the driving members 92 and 94. More specifically, to shift the vertical position of the idler 120, the speed control means 66 includes a toggle type actuating member 220 (Figs. 1, 8, and 13) having a slot 221 formed therein. The member 220 is rotatably mounted in a slotted portion 222 of the control knob 63 by a pair of pivot pins 224 and 226 (Fig. 13). The toggle actuator element 220 is secured to the shaft 137, which forms a portion of the speed control means 66, by a toggle link 228 which is pivotally secured at one end within the slot 221 by a pivot pin 230. The other end of the link 228 is pivotally secured to a bifurcated upper portion of the control shaft 137 by a pivot pin 232. In the position of the speed control means 66 illustrated in Fig. 8 of the drawings, the actuator element 220 is disposed in the right hand portion of the slot 222, as viewed in Fig. 8, so that the capstan driving idler 120 is adapted to engage either of the high speed driving portions 92c or 94c of the driving members 92 and 94. However, when the link 228 is pivoted about the axis defined by the pins 224 and 226 to be disposed within the left hand portion of the slot 222, the eccentric arrangement of the pin 230 relative to the axis of rotation defined by the pins 224 and 226 moves the link 228 upwardly so as to slide the shaft 137 upwardly within the hollow shaft 154.

Upward movement of the shaft 137, when viewed in Fig. 8 of the drawings, causes the washer 139 to bear against the enlarged portion 135a of the sleeve 135 so that the plate 134 and the arm 130 slidably mounted thereon are moved upwardly against the resilient action of the spring 143 so that the idler 120 is disposed in horizontal alignment with the low speed driving portions 92b and 94b of the driving members 92 and 94. Therefore, when the control knob 63 and the shafts 137 and 154 are rotated in a counterclockwise direction so that the pin 146 moves out of engagement with the cam member 148, the tension spring 150 moves the idler 120 into driving engagement with the periphery of the flywheel 122 and the periphery of the small diameter driving portion 92b of the driving member 92, thereby to drive the capstan 88 at the reduced speed for providing tape movement of three and three-fourths inches per second. Alternatively, when the knob 63 is rotated in a clockwise direction to the play position in which the magnetic tape is moved from the tape reel 48 to the reel 50 under the control of the capstan 88, the pin 146 moves out of engagement with the cam 148 so that the tension spring 150 slides the arm 130 relative to the supporting plate 134 to move the idler 120 into driving engagement with the flywheel 122 and the small diameter driving portion 94b of the driving member 94, thereby to advance the tape to the reel 50 at the low speed of three and three-fourths inches per second.

To restore the speed control assembly 66 to a position in which the tape is advanced at the high speed of seven and one-half inches per second, the toggle actuator element 220 is pivoted in a clockwise direction to the position shown in Fig. 8 of the drawings so that the compression spring 143 bears on the washer 145 and, accordingly, on the sleeve 135 to move the idler 120 and the supporting means therefor to the position illustrated in Fig. 8 of the drawings in which the idler 120 is adapted to be shifted into engagement with one of the driving portions 92c or 94c when the main control assembly 62 is shifted to one of the play positions.

The speed control means 66 further includes interlock means (Figs. 8 and 14) for permitting the speed at which the apparatus 30 is operated to be changed only when the main control assembly 62 is adjusted to its stop position. More specifically, a lower end of the control shaft 137 is slidably mounted within the bearing 141 carried on the supporting frame 78, and the lower end of the bearing 141 is provided with a counterbore 234 in which the projecting end of a pin 236 carried by the control shaft 137 is slidably mounted. When the control knob 63 and the shaft 137 are rotated to any position other than the stop position, the projecting end of the pin 236 engages the upper wall of the counterbore 234 to prevent the control shaft 137 from being moved upwardly, when viewed in Fig. 8, to shift the position of the speed change idler 120 from the high speed driving position to the low speed driving position. However, when the control knob 63 and the shaft 137 are located in the stop position of the recorder-reproducer apparatus 30, the projecting end of the pin 236 is aligned with a slot 238, which is formed in the bearing 141 in communication with the counterbore 234. When the toggle actuating element 220 is rotated in a counterclockwise direction, as shown in Fig. 8, the projecting end of the pin 236 moves upwardly through the slot 238 to permit the idler 120, together with the plate 134 and the sliding arm 130, to be shifted upwardly to the position in which the idler 120 is adapted to be shifted into driving engagement with the reduced diameter driving portions 92b and 94b of the driving members 92 and 94.

When the speed control assembly 66 is in a position to provide low speed transducing operations in which the idler 120 is adapted to be shifted into engagement with the reduced diameter portions 92b and 94b, the projecting end of the pin 236 cooperates with a counterbore 240 formed in the bearing 141. If the main control knob 63 and, accordingly, the main control assembly 62 is adjusted to any position other than the stop position and an attempt is made to pivot the actuator element 220 in a clockwise direction, when viewed in Fig. 8, the projecting portion of the pin 236 bears against the wall defining the lower surface of the counterbore 240, thereby to prevent downward movement of the control shaft 137. When the knob 63 is adjusted to the stop position, however, the projecting end of the pin 236 is again moved into alignment with the slot 238 to permit the compression spring 143 to move the control shaft 137 and, accordingly, the idler 120 downwardly under the control of the toggle actuating mechanism. Since the interlock means provided in the speed control assembly 66 permits the position of the idler 120 to be shifted in only the stop position (Figs. 5 and 8), in which the idler 120 is moved out of engagement with both of the driving portions 92b or 94b of the driving members 92 or 94, damage to the main control assembly 62 and the speed control assembly 66 is positively prevented by insuring that the idler 120 is not disposed adjacent either of the driving members 92 or 94.

As described above, the reel supporting members 52 and 54 are adapted to be rotated when the main control means 62 is adjusted to either of the play positions in order to take up the tape advanced by the rotating capstan 88. Further, in the fast wind settings of the main control 62, the capstan and pinch roller drive is disabled and the reel supports 52 and 54 are driven to move the magnetic tape between the reels 48 and 50 at a high speed. To accomplish these functions, the reel supporting members 52 and 54 are rotatably mounted on the main frame 78 and are provided with driving means by which they are rotated, the driving means including slip clutch means which are effective in the play positions of the apparatus 30 so that the reels 48 and 50 are only rotated to the degree permitted by the speed at which the magnetic tape is supplied by the capstan 88.

Figure 9:
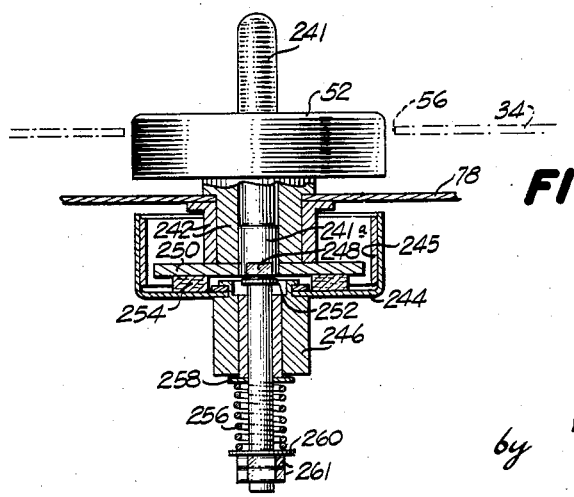

More specifically, the reel supporting member 52 (Fig. 9) is secured to a shaft 241 which is rotatably mounted on the supporting frame 78 by bushings 242. A means for driving the supporting member 52 is provided by a cup-shaped driven element 244 including a cork lining 245 and having a centrally disposed opening in which is secured one end of a cylindrical sleeve 246. To provide a slip clutch for providing driving engagement between the driven element 244 and the reel support 52, the shaft 241 is provided with an enlarged portion 241a having a pair of parallel flats 248 formed thereon. A circular plate 250 having a centrally located opening conforming to the flat sided configuration of the enlarged portion 240a of the shaft 240 is mounted on the shaft 241 so as to bear against the lower ends of the bushings 242 and is retained in position thereon by a lock washer 252 carried by the shaft 241. The plate 250 provides the driven element of the slip clutch assembly, and the driving element of the switch clutch assembly comprises a felt washer 254 which is cemented to an inner surface of the driven element 244 substantially concentric with the sleeve 246. The felt washer 254 is maintained in engagement with the washer 250 by a compression spring 256, which is interposed between a washer 258 engaging the lower end of the sleeve 246 and a washer 260 secured to the lower end of the shaft 241 by a plurality of nuts 261. Therefore, when the driven element 244 is rotated, this rotary movement is transmitted through the felt washer 254 to the plate 250 and the shaft 241 to which this plate is keyed. Rotation of the shaft 241 rotates the reel supporting member 52 so that the reel 48 supported thereon is rotated. When for any reason, such as manually stopping the reel 48 or retarding movement of the magnetic tape toward the reel 48 during a driving operation, the force tending to hold the reel 48 against rotation exceeds the force developed by the frictional coupling between the felt ring 254 and the plate 250, the felt ring 254 will rotate relative to the plate 250 without producing rotation thereof, thereby providing a slip clutch arrangement.

The support 54 for the reel 50 is rigidly secured to a shaft 262 which is rotatably mounted on the supporting frame 78, in the same manner as the shaft 241 and the support 52, by a pair of bushings 264 (Fig. 7) which are similar to the bushings 242. The shaft 262 and the supporting member 54 are rotated by a driven element 266 which is connected to the shaft 262 through a slip clutch arrangement identical to that illustrated in Fig. 9 in conjunction with the reel support 52 so that the rotatable supporting and driving means for the reel supports 52 and 54 are identical.

Figure 15:
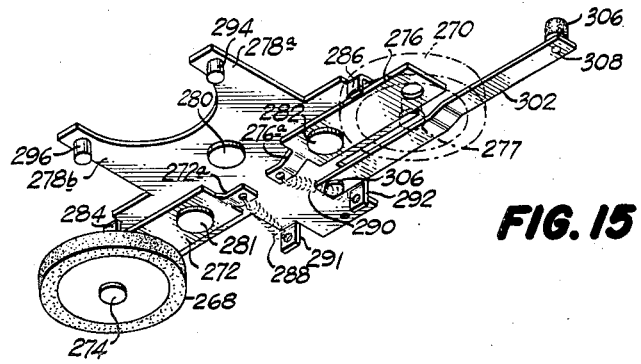
Fig. 15 is an enlarged perspective view of a shiftable plate for movably supporting a pair of idlers for selectively driving the tape reels.

To provide means for selectively driving the driven element 244 and 266, a pair of rubber tired idlers 268 and 270 (Figs. 5–7 and 15) are provided, the idler 268 driving the pulley 244 under the control of the driving member 92 and the idler 270 driving the pulley 266 under the control of the driving member 94. The idler 268 is rotatably mounted on an arm 276 by a pin 274, and the idler 270 is rotatably mounted on an arm 276 by a pin 277. The arms 272 and 276 are pivotally mounted on a plate 278 by a pair of pivot pins 281 and 282, respectively, and the plate 278 is pivotally secured to the main frame 78 by a pivot pin 280 (Figs. 8 and 15). The arms 272 and 276 are normally biased into engagement with a pair of depending flanges 284 and 286 by a pair of tension springs 288 and 290 which are connected between offset end portions 272a and 276a of these arms and a pair of depending lugs 291 and 292 formed on the plate 278.

In the normal or stop position shown in Fig. 5 of the drawings, both of the idlers 268 and 270 are maintained out of engagement with the driven elements 244 and 266 and the driving members 92 and 94. However, to rotate the supporting members 52 and 54 in the play and fast wind positions of the apparatus 30, the main control assembly 62 includes means for shifting the position of the plate 278, to place a selected one of the idlers 268 or 270 in driving engagement in accordance with the direction in which the magnetic tape is to be advanced. More particularly, the plate 278 is provided with a pair of spaced leg portions 278a and 278b, each of which is provided with one of a pair of depending cam followers 294 and 296. These cam followers normally engage the stop shoulders 208 and 211 (Fig. 5) formed on the control cam 152 to maintain the plate 278 and, accordingly, the idlers 268 and 270 in the stop position illustrated in Fig. 5 in which they are out of driving engagement with both of the driving members 92 and 94 and also both of the driven pulleys 244 and 266.

However, when the magnetic tape is to be advanced from the reel 50 to the reel 48, the main control knob 63 is rotated in a counterclockwise direction to rotate the control cam 156 to the position illustrated in Fig. 6. In moving to this position, the cam follower 294 slides over an inclined surface 298 formed in the periphery of the control cam 152 so as to deflect or pivot the plate in a counterclockwise direction around the axis provided by the pivot pin 280. This counterclockwise rotation of the plate 278 moves the rubber tired periphery of the idler 268 into driving engagement with the outer periphery of the driven element 244 and the driving portion 92a of the driving member 92. The counterclockwise rotation of the driving member 92 produces similarly directed rotation of the driven pulley 244 and, accordingly, of the reel support 52 and shaft 241 so that the reel 48 is rotated in a counterclockwise direction to take up the magnetic tape supplied from the reel 50. In the play position illustrated in Fig. 6, the capstan and pinch roller drive is effective to control the speed at which the magnetic tape is delivered to the reel 48, and, since the speed of rotation of the driven element 244 exceeds the speed at which the magnetic tape is supplied to the reel 48, the slip clutch permits the driven pulley 244 to overrun the reel 48 and to provide constant tension on the tape being supplied by the capstan 88. In order to resiliently urge the idler 268 into driving engagement with both the pulley 244 and the driving portion 92a of the driving member 92, the counterclockwise rotation of the plate 278 causes the supporting arm 272 to pivot in a clockwise direction around the axis of the pivot pin 281, thereby to extend the tension spring 288 to provide a resilient force urging the idler 268 into driving engagement with the elements 292 and 244.

When the main control assembly 62 is adjusted to the fast wind position in which tape is supplied to the reel 48 by adjusting the knob 63 in a counterclockwise direction, the cam 152 is rotated in a counterclockwise direction to the position illustrated in Fig. 7 of the drawings. In this position the cam follower 296 remains out of engagement with the periphery of the control cam 152, and the continuing engagement of the follower 294 with the periphery of the cam 152 maintains the plate 278 pivoted in a counterclockwise direction to the same position illustrated in Fig. 6 for the play position. However, as described above, in this position the cam follower 190 and the control arm 184 are displaced to render the capstan 88 ineffective to drive the magnetic tape. Accordingly, counterclockwise rotation of the driven element 244 and of the shaft 241 and the supporting member 52 advances the magnetic tape at a high speed without slipping in the clutch to permit the tape to be quickly transferred from the reel 50 to the reel 48.

When the main control assembly 62 is returned to its normal home position (Fig. 5) from either of the positions illustrated in Figs. 6 or 7 of the drawings, the follower 296 moves into engagement with the stop shoulder 211, and the follower 294 moves downwardly on the inclined surface 298 into engagement with the stop shoulder 208, thereby to pivot the plate 278 in a clockwise direction about the axis of the pivot pin 280. In thus displacing the plate 278, the idler 268 is moved out of driving engagement with the pulley 244 and the portion 92a of the driving member 92, and the arm 272 concurrently pivots in a counterclockwise direction about the pin 281 under the control of the spring 288 so that the arm 272 again moves into engagement with the stop lug 284 so that both of the idlers 268 and 270 are out of driving engagement with the pulleys 244 and 266 and the driving members 92 and 94.

When the magnetic tape is to be moved from the reel 48 to the reel 50 by movement of the knob 63 in a clockwise direction to either the play position or the fast wind position, the follower 296 slides along an inclined surface 300 formed on the control cam 152, and the follower 294 moves out of engagement with the periphery of the control cam 152, thereby to displace the plate 278 in a clockwise direction. This deflection holds the idler 268 out of any driving engagement and moves the pulley 270 into driving engagement with the periphery of the driven pulley 266 and the portion 94a of the driving member 94. The clockwise rotation of the member 94 is transmitted through the idler 270 to rotate the driven pulley 266 and, accordingly, the shaft 262 and the reel supporting member 54 in a clockwise direction so that the magnetic tape is withdrawn from the reel 48 and taken up on the reel 50. In the event that the main control assembly 62 is adjusted to the play setting, the driven pulley 266 overruns the reel 50 inasmuch as the magnetic tape is supplied to the reel 50 under the control of the drive capstan 88 at a lesser speed than the pulley 266 is driven by the idler 270.

When the main control assembly 62 is adjusted to the fast wind position, the capstan drive is disabled so that the magnetic tape is taken up on the reel 50 by directly driving this reel from the driven pulley 266 without slipping in the clutch so as to provide a means for rapidly transferring magnetic tape from the reel 48 to the reel 50. When the knob 63 and the control assembly 62 are returned to the stop position illustrated in Fig. 5, the follower 296 slides down the cam surface 300 so that the followers 294 and 296 engage the stop shoulders 208 and 211, thereby to pivot the supporting plate 278 to the normal position illustrated in Fig. 5 in which both of the idlers 268 and 270 are moved out of engagement with the driving members 92 and 94.

Since the transducing heads 38 and 40 include gaps disposed adjacent different transverse portions of the magnetic tape, each of these transducing means is controlled by the switching means 42 so as to be effective only during one direction of movement of the magnetic tape between the reels 48 and 50. Since the plate 278 is shifted in direct response to the selection of the direction of tape movement between the reels 48 and 50, this plate is utilized to control the operation of the switching means 42.

More specifically, the transducing head 40 is to be utilized when tape is advanced from the reel 50 to the reel 48, and, accordingly, when the main control assembly 62 is adjusted to the positions illustrated in Figs. 6 and 7, the plate 278 is pivoted in a counterclockwise direction about the axis afforded by the pivot pin 280. In order to operate the switching means 42 in accordance with the selective movement of the plate 278, a control link 302 is provided which is pivotally connected at one end to the plate 278 by a pivot pin 306 (Figs. 6, 7, and 15). The other end of the link 302 is provided with a switch operating roller 306 (Figs. 2, 3, and 4) which is rotatably mounted on the link 302 by a fastener 308, the fastener 308 extending upwardly through an opening 307 in the supporting frame 78. The lower surface of the cylindrical operator or roller 306 and the portion of the fastener 308 extending through the opening or slot 307 aid in guiding movement of the link 302 relative to the supporting frame 78.

In the stop position illustrated in Fig. 2, the operator 306 is disposed between two spring piles 312 and 314 so that neither of these contact spring arrangements are operated. However, when the control knob 63 is rotated in a counterclockwise direction to either the play or fast wind positions illustrated in Figs. 3 and 4, the plate 278 is rotated in a counterclockwise direction to move the link 302 to the left (Figs. 6 and 7) to displace the operator 306 to the left (Figs. 3 and 4), thereby to operate the spring pile 312. The operation of these springs establishes electrical connections between the transducing head 40 and the electronic components of the apparatus 30, thereby to condition the transducing head 40 for performing transducing operations on one channel of the magnetic tape as it is moved from the reel 50 to the reel 48. Conversely, when the control knob 63 is rotated in a clockwise direction from the stop position illustrated in Figs. 2 and 5, the link 302 is moved to the right, as viewed in Fig. 5, so that the operator 306 engages and operates the spring pileup 314, thereby to condition the head 38 for performing transducing operations on the other channel of the magnetic tape when it is moved from the reel 48 to the reel 50.

In addition to establishing selective electrical connections to the transducing heads 38 and 40 so that a selected one of these heads is rendered effective to perform transducing operations during the different directions of movement of the magnetic tape between the reels 48 and 50, it is also necessary to selectively move one of a pair of pressure pad assemblies 316 or 318 into an operative relationship with one of the transducing heads to which electrical connections have been established. The pressure pad assembly 318, which is located adjacent the head 38, comprises a U-shaped bracket 320 (Figs. 2 and 11) which is pivotally mounted on a pin or post 321 carried by the supporting frame 78. A pair of pressure pads 322 and 323, which may be formed of a material such as felt, are cemented to one end of a pair of arms 324 and 326, the arm 326 being mounted on the arm 324 and an offset end portion of the arm 324 being secured to the bight portion of the U-shaped bracket 320. To provide an actuating element for controlling the position of the pressure pad assembly 318, a pin 328 is secured to the lower one of the legs of the bracket 320 and extends downwardly through an opening 330 in the supporting frame 78. A tension spring 332 (Fig. 2) interconnects the bight portion of the bracket 320 with the supporting frame 78 to continuously and resiliently urge the bracket 320 and the pads 322 and 323 for rotation in a clockwise direction about the pin 321.

Similarly, the pressure pad assembly 316, which is located adjacent the transducing head 40 and which is rendered operative to press the magnetic tape against the head 40 when this transducing arrangement is rendered effective by the switching means 42, comprises a bracket 334 which is pivotally mounted on the frame 78 by a pin 335. A pair of pressure pads 336 and 337 are mounted on the bracket 335 by a pair of arms 338 and 340. A pin 342 carried by a lower leg of the bracket 334 provides a means for controlling the position of the pressure pad assembly 316 and extends downwardly through an opening 344 (Fig. 11) in the upper wall of the supporting frame 78. The pressure pad assembly 316, including the bracket 334 and the pressure pads 336 and 337, is normally biased for rotation in a counterclockwise direction to move the pads 336 and 337 adjacent the transducing head 40 by a tension spring 346 which is interconnected between the frame 78 and the bight portion of the bracket 334.

The pressure pad assemblies 316 and 318 are normally held in an ineffective position displaced from the transducing heads 38 and 40 when the main control assembly 62 is adjusted to the stop position illustrated in Fig. 2 of the drawing. More specifically, there is provided a crosspiece 348 (Figs. 2, 3, 4, and 11) which is secured to the link 184 and which is provided with a pair of offset feet 349 and 350 which slidingly engage the upper surface of the supporting frame 78 adjacent the openings 344 and 330. A pair of legs 348a and 348b formed integral with the crosspiece 348 engage the depending pins 328 and 342 in the stop position to prevent the pressure pad assemblies 316 and 318 from being rotated to place the pressure pads in engagement with the transducing heads 38 and 40 under the control of the biasing springs 332 and 346. However, when the knob 63 is rotated in either a clockwise or counterclockwise direction from the stop position to either of the play positions, the follower 190 moves into engagement with either of the recessed portions 204 or 209, thereby permitting the tension springs 194 and 196 to move the control arm 184 downwardly, as viewed in Fig. 2. Downward movement of the control arm 184 produces a corresponding downward movement of the crosspiece 348, thereby to remove the detent provided by the crosspiece 348 so that a selected one of the pressure pad assemblies 316 or 318 can be rendered effective to press the magnetic tape against one of the transducing heads 38 or 40. Since the plate 278 which supports the idlers 268 and 270 is shifted in different directions in accordance with the direction in which the magnetic tape is to be advanced, the plate 278 provides a means for permitting a selected one of the assemblies 316 or 318 to be moved into an effective position in accordance with the direction of movement of the magnetic tape.

The plate 278 exercises this control through a pair of arms or levers 352 and 354 (Figs. 5, 6, 7, and 8) which are pivotally secured at one end to the plate 278 by a pivot pin 356. The other ends of the arms 352 and 354 are mounted for reciprocating movement by a pair of headed pins or rivets 358 and 360 which cooperate with a pair of slots 361 and 362 formed in the outer ends of the arms 352 and 354. In the stop position (Fig. 5), the ends of the arms 352 and 354 are spaced from the pins 328 and 342, these pins being engaged by the crosspiece 348 so as to hold the assemblies 316 and 318 in their normal position. However, when the main control assembly 62 is adjusted in a counterclockwise direction to the play position illustrated in Fig. 6, the crosspiece 348 is moved to release the normal detent means for the assemblies 316 and 318. In addition, the control plate 278 is pivoted in a counterclockwise direction to the position illustrated in Fig. 6 in which the end of the link 352 moves outwardly to engage the pin 328, thereby to prevent pivotal movement of the assembly 318. Concurrently therewith, the link 354 is moved inwardly relative to the pin 342 so that the pressure pad assembly 316 is rotated in a counterclockwise direction by the tension spring 346, thereby to move the pressure pads 336 and 337 to press the magnetic tape against the transducing head 40. As described above, in this position of the main control means 62, the contact spring pile 312 is actuated to interconnect the transducing head 40 with the electronic components of the apparatus 30, and, accordingly, in the position in which the magnetic tape is moved from the reel 50 to the reel 48 under the control of the capstan drive, the pressure pad assembly 316 is moved into an effective position to press the magnetic tape against the transducer 40. The pressure pad assembly 318, although being released by the movement of the crosspiece 348, is not pivoted in a clockwise direction into engagement with the transducing head 38 inasmuch as the end of the link 352 engages the pin 328. If the control knob 63 is further rotated in a clockwise direction to the fast wind position in which transducing operations are not performed by the head 40, it is desirable to return the pressure pad assembly 316 to its normal position. As described above, in moving to this position, the cam follower 190 moves into the recess 206, thereby moving the control arm 184 upwardly to the position illustrated in Fig. 4. In this position, the legs 348a and 348b of the crosspiece 348 again engage the depending pins 328 and 342 so as to move the pressure pads 336 and 337 out of engagement with the transducing means 40, the pressure pads 322 and 323 previously being maintained out of engagement with the transducer 38 by the engagement of the pin 328 with the end of the arm 352.

In a similar manner, when the control knob 63 is rotated in a clockwise direction from the stop position to condition the apparatus 30 for moving the magnetic tape from the reel 48 to the reel 50, the control arm 184 is again moved to move the crosspiece 348 out of engagement with the pins 328 and 342, thereby to release the detent means therefor. Concurrently therewith, the plate 278 is pivoted in a clockwise direction, as described above, so that the link 354 moves outwardly to engage the pin 342, thereby preventing the pressure pad assembly 316 from being moved into engagement with the transducing means 40. However, the arm 352 moves inwardly in response to clockwise rotation of the plate 278 and, accordingly, the pin 328 is not engaged, and the pressure pad assembly 318 pivots in a clockwise direction to move the pressure pads 222 and 223 into engagement with the transducing means 38. Similarly, when the main control assembly 62 is adjusted to a fast wind position in which magnetic tape is moved from the reel 48 to the reel 50, the movement of the follower 190 into engagement with the recess 210 displaces the control link 184 so that the legs 348a and 348b again engage the pins 328 and 342. The assembly 316 has previously been maintained in an inoperative position so the movement of the crosspiece 348 pivots the assembly 318 in a counterclockwise direction against the action of the tension spring 332, thereby to move this assembly into an inoperative position. Return movement of the control knob 63 in a counterclockwise direction to return the control assembly 62 to the stop position moves the crosspiece 348 to again engage the pistons 328 and 342 to restore the pressure pad assemblies 316 and 318 to their normal position and return the plate 278 to its normal position in which the links 352 and 354 are moved out of engagement with the pins 328 and 342.

In order to prevent overrunning of the magnetic tape when settings of the main control means 62 are varied, the recorder-reproducer apparatus 30 is provided with braking means which are effective to momentarily apply a retarding force to the supports 52 and 54 for the reels 48 and 50 during the transition between different operative states of the apparatus 30. More specifically, these braking means comprise a pair of brake arms 364 and 366 which together with the pair of cam follower levers 368 and 370 are pivotally mounted on the upper surface of the supporting frame 78 by a pair of pins 372 and 374. A flanged outer extremity 364a of the brake arm 364 is provided with a resilient brake pad 376 which is cemented thereon. An arm 378 is also secured to the flanged portion 364a of the brake arm 364 and is held in engagement with a flanged portion 368a of the cam follower lever 368 by a tension spring 380 which interconnects the arm 364 with the lever 368. A cam follower pin 380 is secured to one end of the lever 368 and is held in continuous engagement with the outer periphery of a control cam 382 forming a portion of the main control assembly 62 by a tension spring 384, one end of which is secured to the lug 198 and the other end of which is connected to the flanged portion 364a of the brake arm 364.

In a similar manner, the brake arm 366 is provided with a flanged portion 366a to which is cemented a resilient brake pad 386 and to which is secured a projecting arm 388, the lower end of which is held in engagement with a flanged portion 370a of the cam follower lever 370 by a tension spring 390 interconnecting the arm 366 with the lever 370. A cam follower pin 392 is secured to one end of the cam follower lever 370 and is held in continuous engagement with the outer periphery of the control cam 382 by a tension spring 394, one end of which is secured to the lug 200 and the other end of which is secured to the flanged portion 366a of the brake arm 366. The tension spring 394 maintains the brake pad 386 out of engagement with the periphery of the reel supporting member 54 and this force is further coupled through the tension spring 390 to be applied to the lever 370 for maintaining the cam follower pin 392 in engagement with the outer periphery of the control cam 382.

The control cam 382, which forms a portion of the main control means 62, includes a conically recessed center portion 382a (Fig. 8) defining an opening within which is secured the lower end of a sleeve 396 mounted on the shaft 154. A pair of set screws 398 and 399 carried by the sleeve 396 engages the flat surfaces 154a and 154b, respectively (Figs. 8 and 13) of the hollow control shaft 154 to secure the cam 382 to the shaft 154 for rotation therewith.

In the stop position of the recorder-reproducer apparatus 30 (Fig. 2), the tension springs 384 and 394 maintain the brake pads 376 and 386 out of engagement with the reel supporting means 52 and 54 and maintain the follower pins 380 and 392 in engagement with the outer periphery of the control cam 382. When the control knob 63 is rotated in a counterclockwise direction toward the play position illustrated in Fig. 3 of the drawings, the follower pin 392 is engaged by a projection 400 formed in the periphery of the cam 382, thereby to pivot the lever 370 in a clockwise direction about the pin 374. This movement of the cam follower lever 370 tends to elongate the spring 390 so that the brake arm 366 is pivoted in a clockwise direction about the pivot pin 374 to press the resilient brake pad 386 into momentary engagement with the reel supporting member 54. When the main control assembly 62 has been moved into the play position, the follower pin 392 moves into a depression 402 on the periphery of the cam 382 to restore the lever 370 and the brake arm 366 to the position shown in Fig. 3 in which the brake pad 386 is moved out of engagement with the periphery of the reel supporting member 54. During this movement, the pin 380 on the cam follower lever 368 remains in engagement with the smooth outer periphery of the cam 382 so that the brake pad 376 is not moved into engagement with the supporting means 52. Accordingly, since, in the position illustrated in Fig. 3 of the drawings, the magnetic tape is advanced from the reel 50 to the reel 48, the main control assembly 62 includes means for momentarily applying brake to the supporting means 54 for the reel 50 which acts as a supply reel in this particular setting of the main control means 62.

Figure 4:
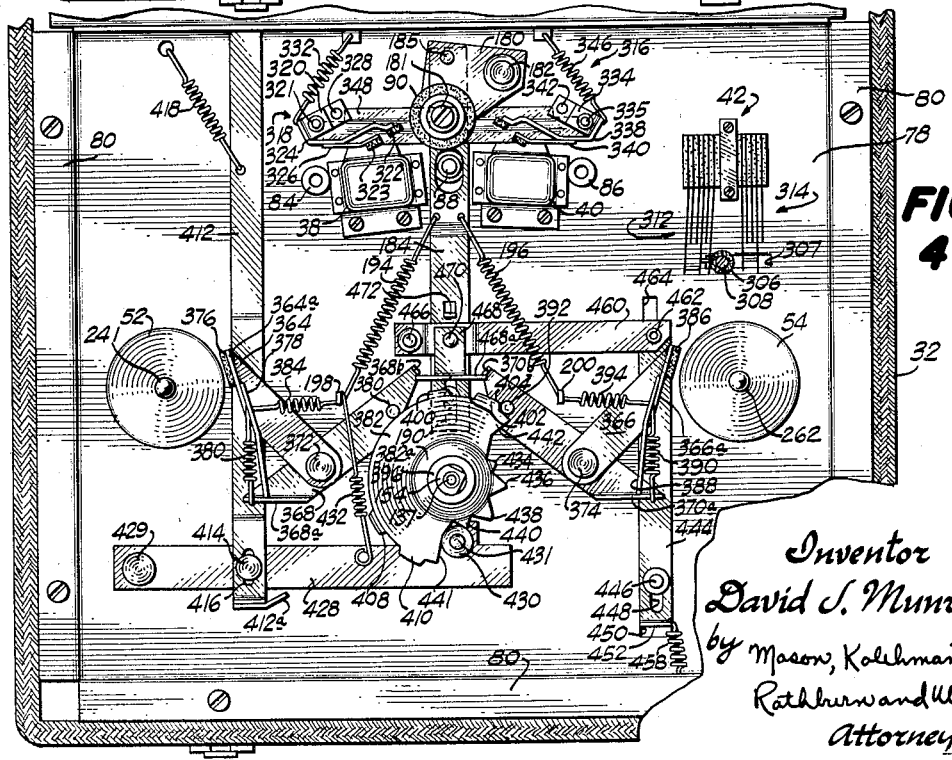
Fig. 4 is a fragmentary top plan view similar to Figs. 2 and 3 showing the apparatus in condition for fast forward movement of the tape in said first direction.

In a like manner, when the control knob 63 is rotated further in a counterclockwise direction to the fast wind position illustrated in Fig. 4, the cam follower pin 392 passes over a projection 404 on the periphery of the cam 382 to again momentarily apply the resilient pad 386 to the periphery of the supporting member 54, thereby to momentarily brake the supply reel 50 in moving from the play position to the fast wind position. Obviously, in returning the main control means 62 from the position illustrated in Fig. 4 to the stop position illustrated in Fig. 2, the follower pin 392 again passes over the projecting portions 400 and 404 so as to momentarily apply a brake to the supporting means 54 in moving from the fast wind position to the play position and from the play position to the stop position.

When the knob 63 is rotated in a clockwise direction to produce similar rotation of the cam 382, a pair of projecting portions 408 and 410 momentarily engage the follower pin 380 to deflect the lever 368 in a counterclockwise direction so as to move the brake arm 364 in a counterclockwise direction so that the brake pad 376 is moved into momentary engagement with the periphery of the reel supporting member 52. In these positions of the main control means 62, the magnetic tape is advanced from the reel 48, which acts as a supply reel, to the reel 50, which acts as a takeup reel, and, accordingly, the brake pad 376 is applied to the supporting member 52 associated with the supply reel when the main control means 62 is adjusted from the stop position to either the play position or the fast wind position or returned from the fast wind and play positions to the stop position.

Figure 18:
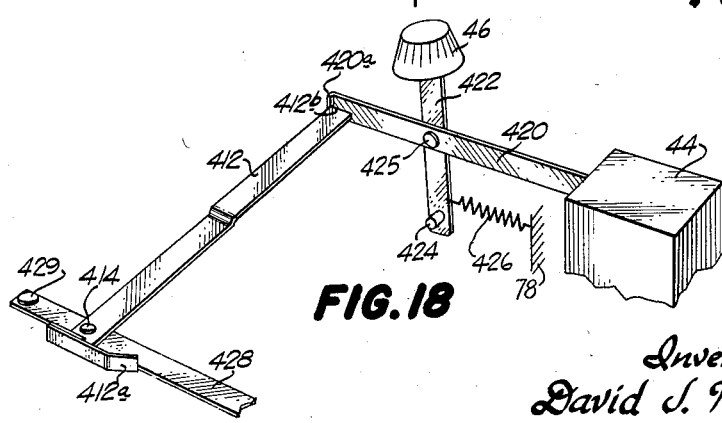
Fig. 18 is a schematic view illustrating a record-listen interlock mechanism.

To prevent an inadvertent erasure of recorded information on the magnetic tape, the recorder-reproducer apparatus 30 is provided with means for interlocking the record-listen control unit 44 (Fig. 18) actuated by the knob 46 with the main control means 62 so that, in response to each operation of the control means 62, the record-listen control unit 44 is automatically returned to a position in which the selected transducing head 38 or 40 is conditioned for a listening operation. The interlock arrangement includes an interlock lever 412 (Figs. 2–4 and 18) which is slidably mounted on the upper surface of the supporting frame 78 by a headed pin 414 which cooperates with a slot 416 in the interlock lever 412. The interlock lever 412 is normally resiliently urged to a locking position by a tension spring 418 which interconnects the lever 412 with the frame 78. With the interlock lever 412 in the position illustrated in Figs. 2 and 18, a locking end portion 412b thereof is adapted to engage and hold a flanged portion 420a formed in an operating arm 420 for the record-listen control unit 44.

When the record-listen control unit 44 is to be shifted to a record position in which the erasing means in the transducing heads 38 and 40 are rendered effective, an operating arm 422, which is pivotally mounted on the frame 78 by a pin 424 at one end and which receives the knob 46 at the other end, is pivoted in a counter-clockwise direction against the action of a return spring 426 so that the flanged or latch portion 420a of the operating arm 420 moves beyond the end portion 412b of the detent arm 412, thereby to secure the arm 420 in the record position and to prevent this arm's return under the control of the return spring 426. In this position, the control unit 44 conditions the one of the transducing heads 38 or 40 which is selected by the operation of the switching means 42 for a recording operation in which items of information supplied from an external source are recorded on the magnetic tape and for erasing previously recorded information from the magnetic tape by the energization of an erase head forming a portion of each of the transducing means 38 and 40.

The cam means 382 provides means for restoring the unit 44 to a listen position in response to each operation of the main control means 62, thereby to prevent the inadvertent erasure of recorded information from the magnetic tape. This releasing means includes an arm 428 which is pivotally mounted on the frame 78 by a pin 429 and which is provided with a cam follower roller 430 rotatably mounted on the lever 428 by a pin 431. The follower 430 is maintained in engagement with the outer periphery of the control cam 382 by a tension spring 432 which is connected at one end to the lever 428 and at its other end to the upstanding lug 198. Assuming that the record-listen control unit 44 is in the position illustrated in Fig. 18 in which the control unit 44 conditions a selected one of the transducing means 38 or 40 for a recording operation, rotation of the control cam 382 in either a clockwise or a counterclockwise direction causes the cam follower roller 430 to ride over one of a plurality of projecting portions 434, 436, 438, or 440 during which the release lever 428 is pivoted in a clockwise direction against the action of the spring 432. In thus moving, the edge of the lever 428 engages a flanged portion 412a on the detent lever 412, thereby to move this lever downwardly as viewed in Fig. 2 against the action of the spring 418.

This movement of the lever 412 moves the end portion 412b out of engagement with the latch or flanged portion 420a on the operating arm 420 so that the return spring 426 pivots the arm 422 in a clockwise direction to restore the control unit 44 to a condition in which the transducing means selected by the switching means 42 is conditioned for a listening operation. When the cam follower roller 430 is returned to the depressed portions separated by the successive projecting portions 434, 436, 438, and 440, the release lever 428 is restored to positions similar to those illustrated in Figs. 3 and 4 of the drawings in which the detent arm 412 is again returned to the position illustrated in Fig. 18 in which it is capable of engaging and retaining the flanged end 420a of the operating arm 420, thereby to permit the unit 44 to be adjusted to and held in a record position in any of the settings of the main control means 62. The cam follower roller 430 also cooperates with the pair of abrupt shoulders 441 and 442 to limit rotation of the control cam 382.

In order to provide means for momentarily arresting movement of the magnetic tape in any of the effective settings of the main control means 62, an auxiliary control means (Figs. 2, 3, and 4) is provided including an operating lever 444 which is slidably mounted on the upper surface of the supporting frame 78 by a headed fastener 446 which cooperates with a slot 448 formed adjacent one end of the operating arm 444. To provide a means for engaging and operating the lever 444, an end portion 444a (Fig. 19) thereof is offset to support a plate 452 which extends downwardly through an opening 450 in the frame 78. An opening 454 is formed in the front wall of the cabinet 32 to permit the insertion of an elongated object for engaging and moving the plate 452, movement of this operating instrument from the opening 454 to the plate 452 being guided by a hollow sleeve 456 which is secured to a lower surface of the supporting frame 78 in alignment with the opening 454. The operating arm 444 is normally biased to the position illustrated in Fig. 2 by a tension spring 458, one end of which is secured to the plate 452 and the other end of which is secured to the supporting frame 78.

The other end of the arm 444 is pivotally connected to a lever 460 by a headed fastener 462, which cooperates with a slot 464 formed in the supporting frame 78 to guide movement of the joined levers 444 and 460. The other end of the arm 460 is pivotally mounted on the supporting frame 78 by a pivot pin 466.

In order to provide means for applying the braking pads 376 and 386 to the reel supports 52 and 54 in all of the settings of the main control means 62, a T-shaped member 468 is pivotally secured to an offset portion of the lever 460 by a pivot pin 470 (Figs. 2 and 8), and the member 468 is provided with an upstanding leg 468a extending at right angles thereto which is adapted to engage offset end portions 368b and 370b of the cam follower levers 368 and 370. When the plate 452 is engaged by an operating instrument and moved to the right, as shown in Fig. 19, the arm 444 is moved upwardly, as viewed in Fig. 2, to pivot the lever 460 in a counter-clockwise direction, thereby to lift the free ends of the cam follower levers 368 and 370. Lifting the levers 368 and 370 pivots the brake arms 364 and 366 about the axes provided by the pins 372 and 374 so that the resilient braking pads 376 and 386 are applied to the peripheries of the reel supporting members 52 and 54, thereby to brake rotation of the reels 48 and 50. Since the cam follower levers 368 and 370 are operated independently of the control cam 382, the application of brakes under the control of the auxiliary operating means is completely independent of the setting of the main control means 62. The brake pads 376 and 386 are moved out of engagement with the supporting means 52 and 54, and the auxiliary operating means is returned to a normal position under the control of the springs 384, 394, and 458 when the displacing force is removed from the plate 452.

Figure 3:
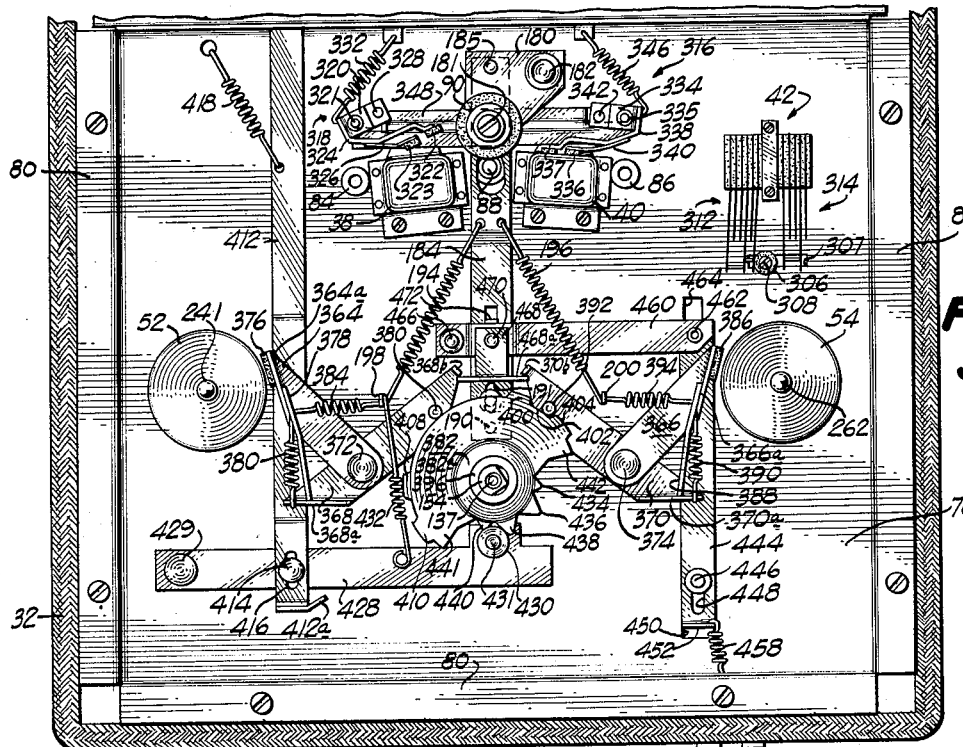
Fig. 3 is a top plan view similar to Fig. 2 illustrating the recorder-reproducer in a position for causing forward movement of the tape in a first direction.

In order to provide control means for lifting the pinch roller 90 out of operative engagement with the drive capstan 88 when the main control setting 62 has been adjusted to either of the play positions and the auxiliary control is operated, the control arm 184 is provided with an upstanding lug 472. When the main control 62 is adjusted to either one of the play positions, one of which is illustrated in Fig. 3, the upstanding lug 472 is moved into engagement with an edge of the operating lever 460. Accordingly, when the lever 460 is pivoted in a counter-clockwise direction due to operation of the auxiliary control means, the control arm 184 is moved upwardly against the resilient action of the springs 194 and 196 so that, independently of the position of the control cam 152, the bracket 180 is pivoted in a clockwise direction to move the pinch roller 90 out of engagement with the drive capstan 88. In this manner, operation of the auxiliary control unit moves the pinch roller 90 out of driving engagement with the capstan 88. The tension springs 194 and 196 return the pinch roller 90 to a position in driving engagement with the capstan 88, without modifying the setting of the main control means 62, in response to the release of the auxiliary control.

The control circuits for the motor 102 and the electronic circuits associated with the transducer heads 38 and 40 are of conventional design and are not disclosed.

In order to explain the operation of the apparatus 30, a summary of the positions of the more important elements thereof in the different positions of the main control assembly 62 is set forth below, Settings of main control 62

| Component | Tape Moving From Reel 48 To Reel 50 | | Stop | Tape Moving From Reel 50 to Reel 48 | |
|---|---|---|---|---|---|
| | Fast Wind | Play | | Play | Fast Wind |
| Transducing Head 38 | Conditioned | Conditioned | Ineffective | Ineffective | Ineffective. |
| Transducing Head 40 | Ineffective | Ineffective | do | Conditioned | Conditioned. |
| Pressure Pad Assembly 318 | Off | On | Off | Off | Off. |
| Pressure Pad Assembly 316 | do | Off | do | On | Do. |
| Pinch Roller 90 | do | On | do | do | Do. |
| Capstan 88 | Driven Clockwise | Driven Clockwise | Stopped | Driven Counterclockwise. | Driven Counterclockwise. Do. |
| Reel Support 52 | Idle | Idle | do | do | Idle. |
| Reel Support 54 | Driven Clockwise | Driven Clockwise | do | Idle | Idle. |
| Brake Pad 376 | Effective Moving Toward Or Away From This Position. | Effective Moving Toward Or Away From This Position. | Off | Off | Off. |
| Brake Pad 386 | Off | Off | do | Effective Moving Toward And Away From This Position. | Effective Moving Toward And Away From This Position. |

Before initiating operation of the tape recorder-reproducer apparatus 30, the reels 48 and 50 are placed on the reel supporting means 52 and 54, respectively, a supply of magnetic tape being provided on one of the reels. This tape is threaded through the opening separating the housings 36 and 37 so that it engages the guide means 84 and 86 and extends across both the upper surfaces of the transducing heads 38 and 40 and between the pinch roller 90 and the capstan 88. The free end of the tape is then secured to the empty one of the reels, which is assumed to be the reel 48. The knob 70 is then operated to supply power to the motor 102, thereby to place both of the driving members 92 and 94 in continuous rotation.

To drive the tape from the reel 50 to the reel 48 at a proper speed for performing a transducing operation, the main control assembly 62 is actuated by rotating the knob 63 in a counterclockwise direction to the play position (Figs. 3, 6, and 21) in which the idler 120 is moved into engagement with the periphery of the flywheel 122 and the driving portion 92c so that the capstan 88 is rotated to advance the magnetic tape at a high speed of seven and one-half inches per second. In the event that the transducing operations are to take place at the lower speed of three and three-fourths inches per second, the speed control unit 66 is operated, as described above, to vertically shift the position of the idler 120 while the main control 62 is in the stop position so that, upon operation of the main control assembly 62 to the play position, the idler 120 is moved into engagement with the driving portion 92b of the driving member 92, thereby to rotate the capstan 88 at a speed suitable for advancing the magnetic tape at the lower of the two transducing speeds.

Movement of the main control 62 to the play position illustrated in Figs. 3 and 6 also moves the pinch roller 90 into driving engagement with the capstan 88, shifts the plate 278 to the position shown in Fig. 6 in which the idler 268 drives the reel supporting member 52 to take up the tape advanced by the capstan 88, moves the link 302 so that the switching means 42 is operated to place the transducing means 40 in operation, and displaces the control link 354 so that the pressure pad assembly 316 is moved into an operative position under the control of the spring 346 to press the magnetic tape against the conditioned transducing head 40. Further, movement of the main control 62 from the stop position to the play position causes the momentary application of the braking pad 386 to the periphery of the reel supporting means 54, the braking pad 386 being moved out of engagement with the member 54 when the unit 62 is fully adjusted to the play position. If the listening operation is to be performed in this setting of the main control 62, the knob 46 is not operated, but if a recording operation is to be performed, the knob 46 is displaced to pivot the arm 422 so that latching end portion 420a of the operating lever 420 moves beyond the end portion 412b of the detent lever 412, thereby actuating the record-listen control unit 44 to condition the selected transducing means 40 for a recording operation.

In order to quickly advance the magnetic tape from the reel 50 to the reel 48, the main control 62 is moved further in a counterclockwise direction to the fast wind position (Figs. 4 and 7) in which the takeup reel 48 on the reel support 52 continues to be rotated by the idler 268 but in which the pinch roller 90 is moved out of engagement with the drive capstan 88 by the control arm 184 and the cam 152. The pressure pad 316 is moved out of effective engagement with the transducing head 40 by the crosspiece 348 inasmuch as transducing operations are not performed at the high speed at which the magnetic tape is advanced from the reel 50 to the reel 48 in the fast wind setting of the main control unit 62. Incident to moving the control means 62 from the play position to the fast wind position, the release lever 428 is pivoted in a clockwise direction to release the interlocking engagement of the members 412 and 420 so that the spring 426 returns the record-listen unit 44 to a listen position in which the erase means in the selected transducing head 40 are rendered ineffective.

To drive the magnetic tape so that transducing operations can be performed on the other channel thereof by the head 38, the main control 62 is rotated in a clockwise direction until it is set to the play position indicated by the indicia disposed on the faceplate 34 to the left of the indicia "Stop" in Fig. 1. In this position, the idler 120 engages the periphery of the flywheel 122 and either of the driving portions 94b or 94c (Fig. 22) in accordance with the setting of the speed control means 66 so that the capstan 88 is rotated at either the high or low speed. Simultaneously therewith, the control cam 152 displaces the control arm 184 so that the pinch roller 90 moves into engagement with the capstan 88 to advance the magnetic tape from the reel 48 to the reel 50. Moving the main control 62 to this setting also displaces the plate 278 in a clockwise direction so that the idler 270 engages the driven pulley 266 to rotate the reel supporting means 54 and, accordingly, the reel 50 in a clockwise direction to take up the magnetic tape supplied by the capstan and pinch roller drive. In order to condition the transducing head 38 for operation, this movement of the plate 278 shifts the control link 302 to operate the switching means 42 so that the transducing head 38 is connected with electronic components in the recorder-reproducer apparatus 30. Concurrently therewith, the link 352 permits movement of the pin 328 so that the pressure pad assembly 318 is moved into operative engagement with the transducing head 38, the link 354 being displaced to engage the pin 342 so as to prevent movement of the pressure pad assembly 316 into an operative position. The completion of these operations in response to adjusting the setting of the main control 62 initiates movement of the magnetic tape, at the speed selected by the speed control means 66, from the reel 48 to the reel 50, and the nature of the transducing operation to be performed during this tape movement is selected, as described above, by selective operation of the knob 46 controlling the record-listen control unit 44. The recorder-reproducer apparatus 30 is returned to a normal condition by moving the main control 62 to the stop position in which the idler 120 is moved out of engagement with the flywheel 122 and the driving members 92 and 94. Further, in this position, the plate 278 is in its normal position in which both of the idlers 268 and 270 are moved out of driving engagement with the driving members 92 and 94 and the driven pulleys 244 and 266. Further, the brake pads 276 and 386 are out of engagement with the reel supporting means 52 and 54, the record-listen control unit 44 has been restored to a listen condition incident to release of the interlock means by adjusting the position of the main control 62, and both of the pressure pad assemblies 316 and 318 are restored to an ineffective position under the control of the crosspiece 348 carried by the control arm 184.

In the event that it is desirable to vary the speed at which the magnetic tape is driven between the reels 48 and 50, the main control 62 must be returned to its stop position to permit the toggle actuating element 220 to be displaced to vary the vertical position of the control shaft 137 and, accordingly, that of the idler 120 so as to selectively position this idler for engagement with one of the driving portions 92b, 94b, 92c, or 94c. In addition, if it becomes necessary during tape driving operations to immediately stop tape movement, the auxiliary control is operated by moving the arm 444 to pivot the lever 460 in a counterclockwise direction. This movement of the lever 460 applies the brake pads 376 and 386 to the reel supporting members 52 and 54 in any of the effective settings of the main control 62, and, in the play settings of the main control 62, the lever 460 engages the upstanding lug 472 so that the pinch roller 90 is moved out of driving engagement with the capstan 88, thereby terminating movement of the magnetic tape until such time as the auxiliary control means is released.

While the invention has been described in conjunction with the recorder-reproducer, it is evident that many of the improvements are directed to components and subcombinations which are applicable to recorders and reproducers of various types as well as apparatus utilizing a magnetic tape as a recording medium. Accordingly, while the invention has been described in connection with the specific details of an illustrated embodiment thereof, it is understood that these details are not intended to be limitations on the invention except insofar as set forth in the accompanying claims.

What is claimed as new and desired to be secured by Letters Patent of the United States is:

1. A recorder-reproducer apparatus for use with an elongated record medium comprising a pair of transducing heads, means for moving said medium in opposite directions relative to said heads, a pressure pad assembly positioned adjacent each of said heads, detent means normally preventing said pressure pad assemblies from urging said medium against said heads, means responsive to initiation of movement of said medium for rendering said detent means ineffective, and means controlled in accordance with the selected direction of movement of said medium for rendering a selected one of said pressure pads effective to urge said medium against one of said transducing heads.

2. A magnetic tape recorder for use with magnetic tape movable in reverse directions comprising means for moving the tape in reverse directions along a selected path, control means for selecting the direction of movement of said tape, a pair of transducing heads disposed adjacent said path for performing transducing operations on said tape, pressure pads movably supported adjacent each of said heads and normally held out of engagement therewith, means operated incident to initiating movement of said medium for conditioning both of said pressure pads for movement into engagement with the transducing heads, and means actuated by said control means for permitting only one of said pressure pads to be moved into engagement with one of said transducing heads in accordance with the selected direction of movement of said tape.

3. A recorder-reproducer apparatus using an elongated record medium, comprising a pair of spaced reels, means for moving said medium between said reels including a shiftable plate supporting a pair of idler pulleys, means for shifting said plates to at least two displaced positions so that one of said pulleys is moved to drive one of said reels to move said medium in one direction in one of said displaced positions of said plate and the other of said pulleys is moved to drive the other of said reels to move said medium in a second direction in the other displaced position of said plate, transducing means positioned adjacent the path of movement of said medium between said reels, and switching means operated by said plate in each of said displaced positions for controlling the establishment of different electrical conditions in said transducing means in accordance with the position of said plate.

4. The apparatus set forth in claim 3 including pressure pad means disposed adjacent said transducing means and movable under the control of said plate.

5. A braking assembly for a transducing apparatus using a record medium moved between spaced reels comprising a rotatably mounted reel support, means for rotating said support, control means for selectively rendering said rotating means effective to drive said support and including a control cam adjustable to different settings, a movably mounted cam follower lever biased into engagement with said cam, a movably mounted brake arm having a brake pad disposed adjacent to and spaced from said support, and resilient means connecting said cam follower lever with said brake arm for conjoint and relative movement, movement of said control cam to certain of said settings producing related movement of said brake arm and said cam follower lever to place said brake pad in engagement with said support.

6. The braking assembly set forth in claim 5 in which the brake arm and the cam follower lever are mounted for pivotal movement about the same axis.

7. In an apparatus for moving an elongated record medium in different directions, a pair of spaced drive means, a motor for rotating one of said drive means, flexible means connecting said spaced drive means to rotate the other of said drive means at the same speed as and in an opposite direction to said one drive means, a capstan and pinch roller drive assembly for moving said medium, and control means for rendering selected ones of said spaced drive means effective to actuate said capstan and pinch roller drive assembly.

8. A recorder-reproducer apparatus for use with elongated lengths of record medium comprising a driving element including portions of different diameter, a reel driving element positioned adjacent to and spaced from said driving element, medium driving means including a capstan and an element for rotating said capstan, first idler means for establishing driving engagement with a fixed one of said portions of said driving element and with said reel driving element to drive said reel driving element at a fixed speed, and second idler means movable relative to said driving element to establish driving engagement with others of said portions of said driving element and with said capstan rotating element to permit said medium driving means to be operated at different speeds relative to the fixed speed at which the reel driving element is operated.

9. The apparatus set forth in claim 8 including first control means for moving said first and second idler means into driving engagement with said driving element, said reel driving element, and said capstan rotating element; second control means for varying the position of said second idler means relative to said driving element; and interlock means for preventing operation of said second control means when said first control means has moved said first and second idler means into driving engagement.

10. Apparatus for moving an elongated record medium between spaced reels comprising a rotatable capstan, a pinch roller movably mounted adjacent said capstan, a driven element secured to said capstan for rotating said capstan, a pair of spaced driving means rotatable about spaced axes, a movably mounted idler disposed adjacent said spaced driving means, control means for selectively engaging said idler with said driven element and with one or the other of said spaced driving means to rotate said capstan and for moving said pinch roller and capstan into driving engagement to advance said medium, and means for adjusting the position of said idler relative to said driving means by movement in a direction parallel to said axes.

11. The apparatus set forth in claim 10 in which the control means includes cam means rotatable about a predetermined axis for moving said pinch roller and capstan into engagement and in which the means for adjusting the position of the idler includes means movable along said predetermined axis.

12. The apparatus set forth in claim 10 including interlock means connecting said control means and said adjusting means to prevent adjustment of said idler when said idler is engaged with said drive element or said driving means.

13. A recorder-reproducer for use with an elongated length of record medium comprising means for moving said medium in a plurality of different manners, means for performing transducing operations on said medium, main control means movable to positions spaced angularly about a first axis for conditioning said recorder-reproducer for a selected manner of tape movement and a selected transducing operation, speed control means including means movable along said first axis for adjusting the speed of movement of said medium, and interlock means including connecting portions on said main control means and said speed control means to permit said speed control means to be actuated to change said speed only in selected settings of said main control means.

14. In an apparatus for moving an elongated record medium between first and second spaced reels, driving means, a first drive mechanism for moving said medium from said first reel to said second reel, a second drive mechanism for moving said medium from said second reel to said first reel, main control means operative to positions angularly spaced about a selected axis for rendering said driving means effective to operate said first and second drive means at a selected speed, and means operative along said axis for changing said selected speed.

15. In an apparatus for moving an elongated record medium relative to a reel, driving means including two spaced driving elements, a first drive mechanism for moving said medium toward said reel, a second drive mechanism for moving said medium away from said reel, control means movable about an axis to a first position for rendering one of said elements effective to operate said first mechanism at a first speed and to a second position for rendering the other of said elements effective to operate said second mechanism at said first speed, and means including means movable along said axis for rendering said first and second mechanisms effective to operate at a second speed different than said first speed.

16. A bidirectional drive assembly for a record medium transducing apparatus comprising a pinch roller and capstan drive means including a capstan driving element; spaced driving members; a shiftable idler for drivingly connecting said capstan driving element with a selected one of said spaced driving members; a plate rotatably supporting said idler, said plate being mounted for pivotal and rectilinear movement; and control means for adjusting the position of said plate between first and second positions in which the pinch roller and capstan drive means is respectively effective and ineffective, said control means including detent means effective in said first position to prevent rectilinear movement of said plate and ineffective in said second position to permit rectilinear movement of said plate toward said driving element and said driving members so as to place said idler in selected driving engagement therewith.

17. The drive assembly set forth in claim 16 in which the control means includes means for producing pivotal movement of said plate away from said first position so that rectilinear movement of said plate places said idler in a driving relation with said driving element and a selected one of said driving members.

18. In an apparatus for moving an elongated record medium between two spaced reels, a pair of spaced driving elements rotating in opposite directions, a capstan drive assembly including a rotatable element for driving said capstan, and control means movable to a first position to render one of said driving elements effective to drive said rotatable element in one direction and to rotate one of said reels and to a second position to render the other of said driving elements effective to drive said rotatable element in a second direction and to rotate the other of said spaced reels.

19. The apparatus set forth in claim 18 in which each of the spaced reels is provided with a rotatable driving means and in which the control means includes both a plurality of movably mounted idlers and means selectively coupling said driving elements to said reel driving means and said rotatable element directly through said idlers.

20. In apparatus for moving a length of elongated record medium between spaced reels, a pair of driving elements operating in different directions, a pair of spaced reel driving means, a carrier plate movably mounted at a point generally disposed between said reel driving means, a pair of idlers movably mounted on said plate, an operation selective shaft movable to different angularly spaced positions for selecting different types of movement for said medium, and means including a lost motion linkage for connecting said operation selective shaft and said carrier plate so that operation of said shaft displaces said plate to place one of said idlers in engagement with said one of said driving elements and one of said reel driving means to drive said medium in a first direction, said lost motion linkage being operative to permit said operation selective shaft to be adjusted to spaced angular positions without moving the carrier plate and affecting the operative drive for said one reel driving means.

21. In apparatus for moving an elongated record medium between spaced reels, a pair of driving elements rotating in opposite directions, a pair of spaced and rotatably mounted reel driving means, means for moving said medium including a drive capstan, a first pivotally mounted idler, a pair of conjointly movable idlers, and control means for concurrently moving said first idler into driving engagement with one of said driving elements to operate said drive capstan and moving one of said pair of conjointly movable idlers into driving engagement with said one driving element to operate one of said reel driving means so that said medium is moved in one direction, said control means also being operative to concurrently move said first idler into engagement with the other of said driving elements to operate said drive capstan and move the other of said pair of conjointly movable idlers into driving engagement with the other of said driving elements for operating the other of said reel driving means so that the medium is moved in another direction.

22. Apparatus for moving a length of elongated record medium between two spaced reels comprising a pair of spaced driving members rotating in opposite directions, a capstan for engaging and advancing said medium, a drive pulley secured to said capstan, a pivotally mounted arm, an idler pulley mounted on said arm, main control means movable to angularly spaced positions for conditioning the apparatus for different types of operation and including a linkage connected to said arm, movement of said main control to one position pivoting said arm to place said idler pulley in driving engagement with one of said driving members and said drive pulley to rotate said capstan in a first direction and movement of said main control to a second position pivoting said arm to place the idler pulley in driving engagement with the drive pulley and the other of said driving member to rotate the capstan in a second direction, a pair of spaced reel driving assemblies, each of said assemblies including slip clutch means, a pivotally mounted plate, a pair of idlers carried by said plate, said main control including means for pivoting said plate in one direction to place one of said pair of idlers in driving engagement with one of said pairs of reel driving assemblies when said main control is moved to said one position and including means for pivoting said plate in another direction to place the other of said pair of idlers in driving engagement with the other of said reel driving assemblies when said main control is moved to said second position.

23. The apparatus set forth in claim 22 including a pair of transducing means disposed adjacent the path of travel of said medium, a pressure pad disposed adjacent each of said transducing means for urging said medium against said transducing means, means including in said main control means for normally preventing movement of said pressure pads toward said transducing means, and means controlled by the position of said plate for moving one of the pressure pads into engagement with one of said transducing means.

24. The apparatus set forth in claim 23 including switch means controlled by the position of said plate for selectively rendering one of said transducing means effective to perform transducing operations on the medium.

References Cited in the file of this patent
UNITED STATES PATENTS
2,741,439     Dale _____ Apr. 10, 1956